United States Patent
Zeng et al.

(10) Patent No.: US 12,531,660 B2
(45) Date of Patent: Jan. 20, 2026

(54) INFORMATION TRANSMISSION METHOD AND DEVICE, AND HARQ-ACK CODEBOOK GENERATION AND TRANSMISSION METHOD AND DEVICE

(71) Applicant: VIVO MOBILE COMMUNICATION CO., LTD., Dongguan (CN)

(72) Inventors: Chaojun Zeng, Dongguan (CN); Na Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 504 days.

(21) Appl. No.: 17/986,881

(22) Filed: Nov. 14, 2022

(65) Prior Publication Data
US 2023/0075353 A1    Mar. 9, 2023

Related U.S. Application Data

(63) Continuation of application No. PCT/CN2021/093020, filed on May 11, 2021.

(30) Foreign Application Priority Data

May 15, 2020    (CN) .......................... 202010415393.8

(51) Int. Cl.
   *H04W 72/23*       (2023.01)
   *H04L 1/1812*      (2023.01)
   (Continued)

(52) U.S. Cl.
   CPC .......... *H04L 1/1812* (2013.01); *H04L 5/0053* (2013.01); *H04W 72/0446* (2013.01); *H04W 72/23* (2023.01)

(58) Field of Classification Search
   CPC ... H04L 1/1812; H04L 5/0053; H04L 1/1822; H04L 1/1861; H04L 1/1864;
   (Continued)

(56) References Cited

U.S. PATENT DOCUMENTS

2020/0067656 A1    2/2020   Lyu et al.
2020/0106566 A1    4/2020   Yeo et al.
(Continued)

FOREIGN PATENT DOCUMENTS

CN    105050122 A    11/2015
CN    106535335 A    3/2017
(Continued)

OTHER PUBLICATIONS

Extended European Search Report issued in related European Application No. 21804517.7, mailed Sep. 8, 2023, 10 pages.
(Continued)

*Primary Examiner* — Anh Vu H Ly
(74) *Attorney, Agent, or Firm* — IPX PLLC

(57) ABSTRACT

An information transmission method and device, and a HARQ-ACK codebook generation and transmission method and device, are provided. The information transmission method includes transmitting downlink control information DCI used for triggering a one-shot hybrid automatic repeat request acknowledgement HARQ-ACK codebook to report, where the DCI carries assistance information instructing a terminal to perform one-shot HARQ-ACK codebook reporting.

19 Claims, 6 Drawing Sheets

(51) Int. Cl.
*H04L 5/00* (2006.01)
*H04W 72/0446* (2023.01)

(58) Field of Classification Search
CPC .............. H04L 1/1607; H04L 1/1858; H04W 72/0446; H04W 72/23; H04W 72/56
See application file for complete search history.

(56) References Cited

U.S. PATENT DOCUMENTS

| | | | |
|---|---|---|---|
| 2022/0052793 A1* | 2/2022 | Bao | H04L 1/1822 |
| 2022/0278781 A1* | 9/2022 | Lin | H04L 1/1822 |
| 2022/0303100 A1* | 9/2022 | Yang | H04L 1/1671 |
| 2022/0304029 A1* | 9/2022 | Wu | H04L 1/1861 |
| 2022/0393799 A1* | 12/2022 | Li | H04L 1/1812 |
| 2022/0407632 A1* | 12/2022 | Khoshnevisan | H04L 1/1861 |
| 2023/0072973 A1* | 3/2023 | Lee | H04L 1/1854 |
| 2023/0074723 A1* | 3/2023 | Alfarhan | H04L 1/1614 |
| 2023/0155746 A1* | 5/2023 | Ouchi | H04W 72/232 370/329 |
| 2023/0164762 A1* | 5/2023 | Lin | H04W 72/11 370/329 |
| 2023/0309113 A1* | 9/2023 | Lin | H04L 1/1685 |
| 2024/0154733 A1* | 5/2024 | Lei | H04L 1/1671 |

FOREIGN PATENT DOCUMENTS

| | | |
|---|---|---|
| CN | 109152004 A | 1/2019 |
| CN | 109314987 A | 2/2019 |
| CN | 109588059 A | 4/2019 |
| CN | 109905211 A | 6/2019 |
| CN | 110149172 A | 8/2019 |
| CN | 110546911 A | 12/2019 |
| CN | 110708145 A | 1/2020 |
| CN | 110708146 A | 1/2020 |
| CN | 111130735 A | 5/2020 |
| CN | 112042142 A | 12/2020 |
| EP | 3361806 A1 | 8/2018 |
| EP | 3528398 A1 | 8/2019 |
| WO | 2020001134 A1 | 1/2020 |
| WO | 2020022523 A1 | 1/2020 |
| WO | 2020062055 A1 | 4/2020 |

OTHER PUBLICATIONS

LG Electronics: "HARQ procedure for NR-U", 3GPP Draft; R1-1912391, Nov. 2019, 22 pages.
LG Electronics: "HARQ procedures for NR-U", 3GPP Draft; R1-19085378, Aug. 2019, 19 pages.
Nokia et al.: "HARQ scheduling and feedback for NR-U", 3GPP Draft; R1-1906644, May 2019, 14 pages.
International Search Report issued in corresponding International Application No. PCT/CN2021/093020, mailed Jul. 30, 2021, 4 pages.
Mediatek Inc., "Enhancements to HARQ for NR-U operation", 3GPP TSG RAN WG1 #97, R1-1906545 May 17, 2019, 11 pages.
Nokia et al., "Remaining issues on NR-U Harq scheduling and feedback", 3GPP TSG RAN WG1 Meeting #100e, R1-2000503, Feb. 28, 2020, 12 pages.
First Office Action issued in related Chinese Application No. 202010415393.8, mailed Apr. 6, 2022, 20 pages.
Qualcomm Incorporated, "Enhancements to Scheduling and HARQ operation for NR-U", 3GPP TSG RAN WG1 Meeting #98bis, R1-1911099, Oct. 2019, 17 pages.
Huawei et al., "Corrections on HARQ-ACK feedback", 3GPP TSG RAN WG1, R1-2000199, Feb. 2020, 5 pages.
Huawei et al., "Maintenance on HARQ-ACK enhancement", 3GPP TSG RAN WG1, R1-2001536, Apr. 2020, 8 pages.
Qinying Zhou, "New HARQ System Based on RCPC and Sub-packet Transmission", Journal of Electronics & Information Technology, Jan. 2007.

* cited by examiner

INFORMATION TRANSMISSION METHOD AND DEVICE, AND HARQ-ACK CODEBOOK GENERATION AND TRANSMISSION METHOD AND DEVICE

CROSS-REFERENCE TO RELATED APPLICATIONS

This application is a continuation of International Application No. PCT/CN2021/093020, filed on May 11, 2021, which claims priority to Chinese Patent Application No. 202010415393.8, filed on May 15, 2020. The entire contents of each of the above-identified applications are expressly incorporated herein by reference.

TECHNICAL FIELD

This application relates to the field of communication technologies, and specifically, to an information transmission method and device, and a Hybrid Automatic Repeat reQuest ACKnowledgement (HARQ-ACK) codebook generation and transmission method and device.

BACKGROUND

In a further communication system, an unlicensed band may be used as a complement to a licensed band to help an operator to expand services. The unlicensed band is shared by a plurality of Radio Access Technology (RAT), such as Wi-Fi, a radar, and Long Term Evolution (LTE)-based licensed band-assisted access to the unlicensed band (LTE-based Licensed-Assisted Access (LTE-LAA)), so that in some regions, during use, the unlicensed band needs to conform to regulatory rules to ensure that all devices can share the resource fairly, such as a Listen Before Talk (LBT) channel or a Maximum Channel Occupancy Time (MCOT). When a transmission node needs to transmit information, the transmission node is required to first execute the LBT on a specified wireless channel, to perform Energy Detection (ED) on a surrounding wireless transmission environment, when energy is lower than a specific threshold, the channel is determined as idle, and transmission may be started in this case. Otherwise, the channel is determined as busy, and the transmission node cannot perform transmission. The transmission node may be a base station, a terminal, or a Wi-Fi node. After transmission is started, a channel time occupied by the transmission node cannot exceed the MCOT.

To ensure that understandings of a terminal side and a network side on a Hybrid Automatic Repeat reQuest ACKnowledgement Codebook (HARQ-ACK Codebook) are consistent and all HARQ-ACK information of all configured HARQ processes are fed back, a one-shot HARQ-ACK codebook feedback mechanism is introduced, which may also be referred to as a Type-3 codebook and is used for feeding back HARQ-ACK information for all possible codewords of all configured HARQ processes on all carriers currently configured for the terminal. To ensure that understandings of the terminal and the network on a Physical Downlink Shared CHannel (PDSCH) transmission corresponding to HARQ-ACK bits that are fed back are consistent, so as to avoid a fuzzy understanding problem caused by missed detection on Downlink Control Information (DCI), a New Data Indicator (NDI) of each codeword may be further included in a one-shot codebook. If a codeword of a HARQ-ACK process has not been scheduled, a corresponding NDI may be assumed as 0, and whether the code work is included may be configured by the network side. In addition, the network may configure HARQ-ACK of a Code Block Group (CBG) granularity to support CBG-based retransmission.

When a one-shot codebook is organized, a traversing sequence of all dimensions is as follows: a CBG index—a Transport Block (TB) index—a HARQ process ID—a serving cell index. The NDI is attached after HARQ-ACK information of a corresponding TB.

When the one-shot HARQ-ACK codebook reported by the terminal is configured, a 1-bit one-shot HARQ-ACK request field may exist in a DCI format 1_1. When the field is set to 1, the terminal considers that the network uses the DCI format 1_1 to trigger to feed back the one-shot HARQ-ACK codebook, and a fed back Physical Uplink Control CHannel (PUCCH) opportunity and PUCCH resources are indicated by a corresponding field in the DCI.

A Frequency Domain Resource Assignment (FDRA) field in the DCI format 1_1 (namely, a value of the one-shot HARQ-ACK request field is 1) triggering the one-shot HARQ-ACK codebook may be set to a specified value, to indicate that the DCI format 1_1 actually does not schedule a PDSCH.

In the related art, for enhancement of Uplink Control Information (UCI), 2 priorities for HARQ-ACK are introduced. When a PUSCH is scheduled by a DCI format 0_1/0_2, a priority index (0 or 1) corresponding to the scheduled PUSCH transmission may be indicated by a priority indicator field in the DCI. When the PDSCH is scheduled by a DCI format 1_1/1_2, priority indexes (0 or 1) of corresponding HARQ-ACK feedback and PUCCH transmission carrying the feedback may be indicated by the priority indicator field in the DCI. When PUSCH/PUCCH transmission does not indicate a corresponding priority index, a default priority index 0 is used. Time domain overlapping PUSCH/PUCCH related processing is performed only when corresponding priorities are the same, otherwise, if PUSCH/PUCCH transmissions with different priorities are overlapped, transmission corresponding to a priority index 0 is discarded, and only transmission corresponding to a priority index 1 is transmitted. The UCI is assumed to be the same as a priority of a PUCCH/PUSCH carrying the UCI.

In a process of implementing this application, it is found that the related art has at least the following problems: when the network uses the DCI format 1_1 to trigger the terminal to feed back the one-shot HARQ-ACK codebook, the FDRA field in the DCI format 1_1 triggering feedback may be set to a specified value to indicate that the terminal actually does not schedule the PDSCH according to the DCI format 1_1. In this case, many fields in the DCI actually are not used, leading to a relatively great resource waste.

SUMMARY

An information transmission method and device, and a HARQ-ACK codebook generation and transmission method and device, are provided.

According to a first aspect, an embodiment of this application provides an information transmission method, applied to a network-side device and including:
transmitting DCI used for triggering a one-shot HARQ-ACK codebook to report, where
the DCI carries assistance information instructing a terminal to perform one-shot HARQ-ACK codebook reporting.

According to a second aspect, an embodiment of this application provides an information transmission method, applied to a terminal and including:

receiving downlink control information DCI used for triggering a one-shot HARQ-ACK codebook to report, where the DCI carries assistance information instructing a terminal to perform one-shot HARQ-ACK codebook reporting.

According to a third aspect, an embodiment of this application provides a method for determining a HARQ-ACK codebook, applied to a terminal and including:

receiving DCI used for triggering a one-shot HARQ-ACK codebook to report, where the DCI includes a priority indicator field; and generating the one-shot HARQ-ACK codebook according to a configuration parameter of a priority indicated by the priority indicator field.

According to a fourth aspect, an embodiment of this application provides a method for transmitting a HARQ-ACK codebook, applied to a network-side device and including:

transmitting DCI used for triggering a one-shot HARQ-ACK codebook to report, where the DCI includes a priority indicator field; and receiving and parsing the one-shot HARQ-ACK codebook according to a configuration parameter of a priority indicated by the priority indicator field.

According to a fifth aspect, an embodiment of this application provides an information transmission apparatus, applied to a network-side device and including:

a first transmission module, configured to transmit DCI used for triggering a one-shot HARQ-ACK codebook to report, where the DCI carries assistance information instructing a terminal to perform one-shot HARQ-ACK codebook reporting.

According to a sixth aspect, an embodiment of this application provides an information transmission apparatus, applied to a terminal and including:

a first receiving module, configured to receive DCI used for triggering a one-shot HARQ-ACK codebook to report, where the DCI carries assistance information instructing a terminal to perform one-shot HARQ-ACK codebook reporting.

According to a seventh aspect, an embodiment of this application provides an apparatus for determining a HARQ-ACK codebook, applied to a terminal and including:

a second receiving module, configured to receive DCI used for triggering a one-shot HARQ-ACK codebook to report, where the DCI includes a priority indicator field; and a codebook generation module, configured to generate the one-shot HARQ-ACK codebook according to a configuration parameter of a priority indicated by the priority indicator field.

According to an eighth aspect, an embodiment of this application provides an apparatus for transmitting a HARQ-ACK codebook, applied to a network-side device and including:

a second transmission module, configured to transmit DCI used for triggering a one-shot HARQ-ACK codebook to report, where the DCI includes a priority indicator field; and a processing module, configured to receive and parse the one-shot HARQ-ACK codebook according to a configuration parameter of a priority indicated by the priority indicator field.

According to a ninth aspect, an embodiment of this application provides an electronic device, including a processor, a memory, and a program or instruction stored in the memory and executable on the processor, when the program or instruction is executed by the processor, the steps of the method according to the first aspect, the second aspect, the third aspect, or the fourth aspect are implemented.

According to a tenth aspect, an embodiment of this application provides a readable storage medium, storing a program or instruction, when the program or instruction is executed by a processor, the steps of the method according to the first aspect, the second aspect, the third aspect, or the fourth aspect are implemented.

According to an eleventh aspect, an embodiment of this application provides a chip, including a processor and a communication interface, the communication interface being coupled to the processor, the processor being configured to execute a program or instruction, to implement the method according to the first aspect, the second aspect, the third aspect, or the fourth aspect.

DETAILED DESCRIPTION

The following describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

In the specification and claims of this application, the terms "first," "second," and the like are intended to distinguish between similar objects but do not indicate a particular order or sequence. It should be understood that the data termed in such a way is interchangeable in proper circumstances, so that the embodiments of this application described herein can be implemented in other orders than the order illustrated or described herein. In addition, in the specification and claims, "and/or" indicates at least one of connected objects, and the character "/" generally indicates an "or" relationship between associated objects.

The following describes the embodiments of this application with reference to the accompanying drawings. The information transmission method and device, and the HARQ-ACK codebook generation and transmission method and device provided in the embodiments of this application may be applied to a wireless communication system. The wireless communication system may be a 5G system, a Long Term Evolution (LTE) system, an Evolved Long Term Evolution (eLTE) system, or a subsequent evolved communication system.

The embodiments of this application use LTE and NR systems as an example but are not limited to the systems, and the technical solutions provided in this application may be applied to other systems having the same problem.

The following describes the information transmission method and device, and the HARQ-ACK codebook generation and transmission method and device provided in the embodiments of this application in detail with reference to the accompanying drawings through specific embodiments and application scenarios.

Figure 1:
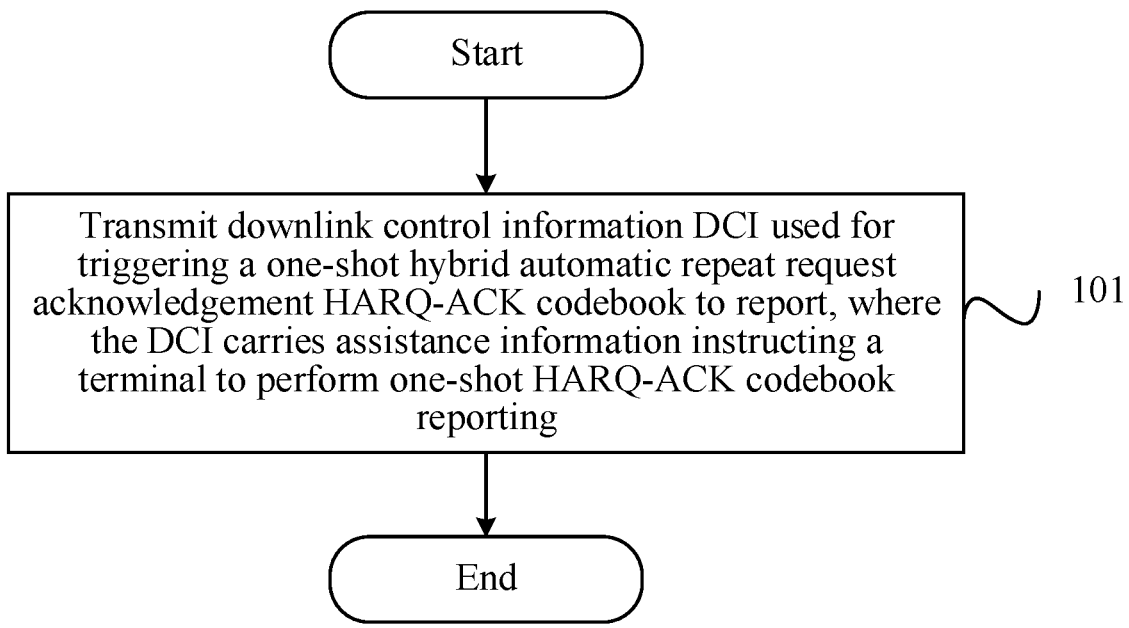
FIG. 1 is a first step flowchart of an information transmission method according to an embodiment of this application.

As shown in FIG. 1, an embodiment of this application provides an information processing method, applied to a network-side device and including:

Step 101. Transmit DCI used for triggering a one-shot HARQ-ACK codebook to report, where the DCI carries assistance information instructing a terminal to perform one-shot HARQ-ACK codebook (which may be referred to as one-shot HARQ-ACK codebook) reporting.

In some implementations, the DCI does not schedule a PDSCH (for example, an FDRA field of the DCI is set to a specified value), and the assistance information is indicated through a field related to PDSCH scheduling in the DCI; or the DCI schedules a PDSCH, and the assistance information may be indicated by a newly added field or another field in the DCI in this case.

In some implementations, the assistance information includes at least one of the following:

information about serving cell(s) corresponding to the one-shot HARQ-ACK codebook to be reported, to reduce a number of bits corresponding to the HARQ-ACK codebook, where only HARQ-ACK corresponding to a serving cell (a set or a subset) focused by a network is reported;

information about HARQ process(es) corresponding to the one-shot HARQ-ACK codebook to be reported, to reduce a number of bits corresponding to the HARQ-ACK codebook, where only HARQ-ACK corresponding to a HARQ process (a set or a subset) focused by a network is reported;

information about Transport Block TB(s) corresponding to the one-shot HARQ-ACK codebook to be reported, to reduce a number of bits corresponding to the HARQ-ACK codebook, where only HARQ-ACK corresponding to a TB (a set or a subset) focused by a network is reported;

information about Code Block Group CBG(s) corresponding to the one-shot HARQ-ACK codebook to be reported, to reduce a number of bits corresponding to the HARQ-ACK codebook, where only HARQ-ACK corresponding to a CBG (a set or a subset) focused by a network is reported; or high-level configuration parameter(s) for the one-shot HARQ-ACK codebook to be reported, to flexibly control an attribute fed back by HARQ-ACK. The high-level configuration parameter indicated herein covers a corresponding high-level configuration parameter configured or indicated by a terminal, and controls or affects organization or generation of the one-shot HARQ-ACK codebook. Generally, a transmission success rate of the DCI is relatively lower than that of a Radio Resource Control (RRC) parameter configuration. Therefore, in some implementations, overriding on the high-level configuration parameter by the DCI reported by the triggered one-shot HARQ-ACK codebook is only applicable to HARQ-ACK codebook triggering and reporting this time.

In some implementations, whether the DCI indicates the assistance information may be regulated by regulations or configured through the high-level parameter. In some implementations, when the DCI indicates the assistance information, the DCI indicates assistance information that may be regulated by the regulations or configured by the high-level parameter, and for example, the assistance information may include information about serving cell(s) and information about HARQ process(es).

In some implementations, the DCI may also indicate whether the assistance information is included in the DCI. For example, in the DCI, a 1-bit field indicates whether the assistance information is included, "0" identifies that the DCI does not include the assistance information, and "1" identifies that the DCI includes the assistance information. In some implementations, the DCI may also indicate the assistance information included in the DCI. For example, in the DCI, an N-bit field indicates whether each piece of assistance information is included in the DCI. For example, if N is equal to 5 and a bitmap manner is used, each bit and the 5 pieces of assistance information are in a one-to-one correspondence and whether corresponding assistance information is included in the DCI is indicated. For example, a bit value "0" identifies that the DCI does not include the corresponding assistance information, and "1" identifies that the DCI includes the corresponding assistance information.

In some implementations, the information about serving cell(s) corresponding to the one-shot HARQ-ACK codebook to be reported includes at least one of the following:

an index of a first serving cell for which the corresponding HARQ-ACK will be included in the one-shot HARQ-ACK codebook to be reported, where traversing is performed from the first serving cell corresponding to the index to a last (with a greatest index) serving cell configured for the terminal in ascending order of indexes, and serving cell sets (subsets) formed by these serving cells all need to report corresponding HARQ-ACK;

an index of a last serving cell for which the corresponding HARQ-ACK will be included in the one-shot HARQ-ACK codebook to be reported, where traversing is performed from a serving cell 0 (it is assumed that indexes of serving cells are numbered from 0) to a serving cell corresponding to the index of the last serving cell in ascending order of indexes, and serving cell sets (subsets) formed by these serving cells all need to report corresponding HARQ-ACK;

an index of a first serving cell for which the corresponding HARQ-ACK will be included in the one-shot HARQ- ACK codebook to be reported and an index of a last serving cell for which the corresponding HARQ-ACK will be included in the one-shot HARQ-ACK codebook to be reported, where traversing is performed from a serving cell corresponding to the index of the first serving cell to a serving cell corresponding to the index of the last serving cell in ascending order of indexes, and serving cell sets (subsets) formed by these serving cells all need to report corresponding HARQ-ACK;

an index (namely, index1) of a first serving cell for which the corresponding HARQ-ACK will be included in the one-shot HARQ-ACK codebook to be reported and a number (cell_num) of continuous indexes of a serving cell for which the corresponding HARQ-ACK will be included in the one-shot HARQ-ACK codebook to be reported, where traversing is performed from a serving cell corresponding to the index of the first serving cell to a serving cell corresponding to an index (whose value is index1+cell_num−1) in ascending order of indexes, and serving cell sets (subsets) formed by these serving cells (cell_num serving cells in total) all need to report corresponding HARQ-ACK;

first indication information indicating whether each serving cell needs to report HARQ-ACK, where for example, a $N_{cells}^{DL}$-bit ($N_{cells}^{DL}$ is a number of serving cells configured for the terminal) bitmap is used to indicate whether a serving cell corresponding to each index needs to report, when a bit i is set to 1, it indicates that a serving cell i needs to report, and when the bit i is set to 0, it indicates that the serving cell i does not need to report; and serving cell sets (subsets) formed by serving cells whose corresponding bits are set to 1 (namely, indicating a need to report) all need to report corresponding HARQ-ACK; and an index of at least one serving cell set for which the corresponding HARQ-ACK will be included in the one-shot HARQ-ACK codebook to be reported, where in this case, the network side may configure one or a plurality of serving cell sets in advance through RRC, and the DCI explicitly indicates to apply one or a plurality of serving cell sets thereof; and for example, the network configures one serving cell set list for the terminal in advance through RRC dedicated signaling, the list includes one or a plurality of entries (entry), each entry corresponds to one configured serving cell set, the serving cell set includes one or a plurality of different serving cells, a bit is used to indicate an entry index in the DCI, and each serving cell in a serving cell set corresponding to the entry index needs to report corresponding HARQ-ACK.

In some implementations, the information about HARQ process(s) corresponding to the one-shot HARQ-ACK codebook to be reported includes at least one of the following:

an IDentifier (ID) of a first HARQ process for which the corresponding HARQ-ACK will be included in the one-shot HARQ-ACK codebook to be reported, where traversing is performed from a HARQ process corresponding to the identifier of the first HARQ process to a last (with a greatest identifier) HARQ process configured for the terminal in ascending order of identifiers, and HARQ process sets (subsets) formed by theses HARQ processes all need to report corresponding HARQ-ACK;

an identifier of a last HARQ process for which the corresponding HARQ-ACK will be included in the one-shot HARQ-ACK codebook to be reported, where traversing is performed from a HARQ process 0 (it is assumed that identifiers of HARQ processes are numbered from 0) to a HARQ process corresponding to the identifier of the last HARQ process in ascending order of identifiers, and HARQ process sets (subsets) formed by these HARQ processes all need to report corresponding HARQ-ACK;

an identifier of a first HARQ process for which the corresponding HARQ-ACK will be included in the one-shot HARQ-ACK codebook to be reported and an identifier of a last HARQ process for which the corresponding HARQ-ACK will be included in the one-shot HARQ-ACK codebook to be reported, where traversing is performed from a HARQ process corresponding to the identifier of the first HARQ process to a HARQ process corresponding to the identifier of the last HARQ process in ascending order of identifiers, and HARQ process sets (subsets) formed by these HARQ processes all need to report corresponding HARQ-ACK;

an identifier (ID1) of a first HARQ process for which the corresponding HARQ-ACK will be included in the one-shot HARQ-ACK codebook to be reported and a number id_num of continuous identifiers of a HARQ process for which the corresponding HARQ-ACK will be included in the one-shot HARQ-ACK codebook to be reported, where traversing is performed from a HARQ process corresponding to the identifier of the first HARQ process to a HARQ process corresponding to an index (whose value is ID1+idnum−1) in ascending order of identifiers, and HARQ process sets (subsets) formed by these HARQ processes all need to report corresponding HARQ-ACK; and second indication information indicating whether each HARQ process needs to report HARQ-ACK, where for example, a $N_{HARQ,c}^{DL}$-bit ($N_{HARQ,c}^{DL}$ is a number of HARQ processes configured for a serving cell c of the terminal) bitmap is used to indicate whether a HARQ process corresponding to each ID needs to report, when a bit i is set to 1, it indicates that a HARQ process i needs to report, and when the bit i is set to 0, it indicates that the HARQ process i does not need to report; and HARQ process sets (subsets) formed by HARQ processes whose corresponding bits are set to 1 (namely, indicating a need to report) all need to report corresponding HARQ-ACK.

In some implementations, the information about TB(s) corresponding to the one-shot HARQ-ACK codebook to be reported includes at least one of the following:

indicating HARQ-ACK for TB index 0 will be included in the one-shot HARQ-ACK to be reported; or indicating HARQ-ACK for TB index 0 and 1 will be included in the one-shot HARQ-ACK to be reported.

In some implementations, the indicated index of the reported TB is applicable to each HARQ process reported by the one-shot HARQ-ACK codebook.

In some implementations, the indication is provided only when a serving cell (or at least one serving cell) is configured to support double codewords at most.

For example, 1 bit is used for indication, a value 0 indicates only to report HARQ-ACK for a TB index 0, and a value 1 indicates to report HARQ-ACK for both the TB index 0 and a TB index 1 simultaneously.

In some implementations, the information about CBG(s) corresponding to the one-shot HARQ-ACK codebook to be reported includes:

a maximum index of the CBG(s) corresponding to the one-shot HARQ-ACK codebook to be reported.

The terminal only report, for a TB index of a HARQ process of a serving cell, HARQ-ACK corresponding to each CBG within a range determined from an index 0 to the indicated maximum index. In some implementations, the information of the CBG is only applicable to a serving cell enabling CBG feedback and retransmission, such as a serving cell providing a high-level configuration parameter maxCodeBlockGroupsPerTransportBlock. In some implementations, the indication is provided only when a serving cell (or at least one serving cell) enables CBG-based feedback and retransmission and the terminal is also configured to enable CBG granularity-based one-shot HARQ-ACK codebook reporting (for example, the terminal is configured with a high-level parameter pdsch-HARQ-ACK-OneShot-FeedbackCBG-r16).

In some implementations, the high-level configuration parameter(s) for the one-shot HARQ-ACK codebook to be reported includes at least one of the following:
 third indication information indicating whether to enable spatial bundling when the HARQ-ACK codebook is carried on a physical uplink control channel PUCCH;
 fourth indication information indicating whether to enable spatial bundling when the HARQ-ACK codebook is carried on a physical uplink shared channel PUSCH;
 fifth indication information indicating whether to enable HARQ-ACK feedback of a CBG granularity; or
 sixth indication information indicating whether to report NDI information in the one-shot HARQ-ACK codebook.

In some implementations, the third indication information is included in the DCI only when a serving cell (or at least one serving cell) is configured to support double codewords at most. In some implementations, the third indication information may be indicated by using 1 bit.

In some implementations, the fourth indication information is included in the DCI only when a serving cell (or at least one serving cell) is configured to support double codewords at most. In some implementations, the fourth indication information may be indicated by using 1 bit.

In some implementations, the fifth indication information is included in the DCI only when a serving cell (or at least one serving cell) enables CBG-based feedback and retransmission. In some implementations, the fifth indication information may be indicated by using 1 bit.

In some implementations, the sixth indication information may be indicated by using 1 bit.

In some implementations, the assistance information is carried in the DCI through a first indicator field; and
 the first indicator field satisfies at least one of the following conditions:
 an indicator field that is not used and exists in the DCI;
 an indicator field with a fixed number of bits; or
 an indicator field both existing in a first DCI format and existing in a second DCI format, where the first DCI format is a format (for example, a DCI format 1_1) corresponding to the DCI triggering the one-shot HARQ-ACK codebook, and the second DCI format is a format (for example, DCI format 1_0) corresponding to DCI not used for triggering the one-shot HARQ-ACK codebook.

In some implementations, the indicator field that is not used and exists in the DCI may further be: an indicator field that is not used and exists in the DCI when the DCI does not schedule a Physical Downlink Shared CHannel (PDSCH).

For example, the first indicator field satisfying at least two of the foregoing conditions includes any one of the following cases:
 an indicator field that is not used and exists in the DCI with a fixed number of bits;
 an indicator field that is not used and exists in the DCI with a fixed number of bits when the DCI does not schedule a PDSCH;
 an indicator field that is not used and exists in the DCI and both exists in the first DCI format and exists in the second DCI format;
 an indicator field that is not used and exists in the DCI and both exists in the first DCI format and exists in the second DCI format when the DCI does not schedule a PDSCH;
 an indicator field that is not used and exists in the DCI and both exists in the first DCI format and exists in the second DCI format with a fixed number of bits; or
 an indicator field that is not used and exists in the DCI and both exists in the first DCI format and exists in the second DCI format with a fixed number of bits when the DCI does not schedule a PDSCH.

In some implementations, the first indicator field includes at least one of the following:
 a time domain resource assignment indicator field;
 a Virtual Resource Block (VRB) to Physical Resource Block (PRB) mapping indicator field;
 a Modulation and Coding Scheme (MCS) indicator field;
 a New Data Indicator (NDI) field;
 a Redundancy Version (RV) indicator field;
 a HARQ process identifier indicator field; or
 a Downlink Assignment Index (DAI) indicator field.

For the time domain resource assignment indicator field, the field includes 4 bits in the DCI format 1_0, and the field may include 0, 1, 2, 3, or 4 bits in the DCI format 1_1.

For the VRB to PRB mapping indicator field, the field includes 1 bit in the DCI format 1_0, and the field may include 0 bit in the DCI format 1_1.

For the MCS indicator field, the field includes 5 bits in the DCI format 1_0, and in the DCI format 1_1, an MCS indicator field used for a transport block 1 may be selected, which also includes 5 bits.

For the NDI indicator field, the field includes 1 bit in the DCI format 1_0, and in the DCI format 1_1, an NDI indicator field used for a transport block 1 may be selected, which also includes 1 bit.

For the RV indicator field, the field includes 2 bits in the DCI format 1_0, and in the DCI format 1_1, an RV indicator field used for a transport block 1 may be selected, which also includes 2 bits.

The HARQ process identifier indicator field fixedly includes 4 bits.

For the DAI indicator field, the field includes 2 bits in the DCI format 1_0, and the field may include 0, 2, or 4 bits in the DCI format 1_1.

For example, the information about the serving cell may be indicated by using the modulation and coding scheme indicator field (or initial N bits of the field).

In another example, the information about the HARQ process may be indicated by using the HARQ process identifier indicator field. For example, an identifier of a first or a last HARQ process for which the corresponding HARQ-ACK will be included in the one-shot HARQ-ACK codebook to be reported is indicated by using the HARQ process identifier indicator field, or when a number M of configured HARQ processes does not exceed 4, HARQ processes that need to report are indicated by using first M bits of the field.

In some implementations of this application, the assistance information is carried in the DCI through at least one second indicator field; and the second indicator field is an information indicator field obtained by dividing a bit sequence corresponding to a third indicator field in the DCI according to the assistance information.

The third indicator field satisfies at least one of the following conditions:

an indicator field that is not used and exists in the DCI;
an indicator field with a fixed number of bits; or
an indicator field both existing in a first DCI format and existing in a second DCI format, where the first DCI format is a format (for example, a DCI format 1_1) corresponding to the DCI triggering the one-shot HARQ-ACK codebook, and the second DCI format is a format (for example, DCI format 1_0) corresponding to DCI not used for triggering the one-shot HARQ-ACK codebook.

In some implementations, the indicator field that is not used and exists in the DCI may further be: an indicator field that is not used and exists in the DCI when the DCI does not schedule a PDSCH.

For example, the third indicator field satisfying at least two of the foregoing conditions includes any one of the following cases:

an indicator field that is not used and exists in the DCI with a fixed number of bits;
an indicator field that is not used and exists in the DCI with a fixed number of bits when the DCI does not schedule a PDSCH;
an indicator field that is not used and exists in the DCI and both exists in the first DCI format and exists in the second DCI format;
an indicator field that is not used and exists in the DCI and both exists in the first DCI format and exists in the second DCI format when the DCI does not schedule a PDSCH;
an indicator field that is not used and exists in the DCI and both exists in the first DCI format and exists in the second DCI format with a fixed number of bits; or
an indicator field that is not used and exists in the DCI and both exists in the first DCI format and exists in the second DCI format with a fixed number of bits when the DCI does not schedule a PDSCH.

In some implementations, the third indicator field includes at least one of the following:

a time domain resource assignment indicator field;
a Virtual Resource Block (VRB) to Physical Resource Block (PRB) mapping indicator field;
a Modulation and Coding Scheme (MCS) indicator field;
a New Data Indicator (NDI) field;
a Redundancy Version (RV) indicator field;
a HARQ process identifier indicator field; or
a Downlink Assignment Index (DAI) indicator field.

The third indicator field herein may be a single selected indicator field or a plurality of selected indicator fields. When the third indicator field only involves a single indicator field, the bit sequence corresponding to the third indicator field may directly correspond to a bit sequence occupied by the single indicator field; and when the third indicator field corresponds to a plurality of indicator fields, the bit sequence corresponding to the third indicator field may be a total bit sequence obtained by connecting bit sequences corresponding to the plurality of indicator fields end to end.

The third indicator field satisfies at least one of the following conditions:

an indicator field that is not used and exists in the DCI;
an indicator field that is not used and exists in the DCI when the DCI does not schedule a PDSCH;
an indicator field with a fixed number of bits; or
an indicator field both existing in a first DCI format and existing in a second DCI format, where the first DCI format is a format (for example, a DCI format 1_1) corresponding to the DCI triggering the one-shot HARQ-ACK codebook, and the second DCI format is a format (for example, DCI format 1_0) corresponding to DCI not used for triggering the one-shot HARQ-ACK codebook.

For example, when the bit sequences of the plurality of bit sequences corresponding to the third indicator field are connected end to end, connection may be performed according to an occurrence sequence of the plurality of indicator fields in the DCI or a sequence of an agreement or a high-level configuration, to obtain the bit sequence corresponding to the third indicator field.

The bit sequence corresponding to the third indicator field may be sequentially used for indicating the assistance information according to a configured or agreed sequence. For example, corresponding bits are sequentially connected according to an occurrence sequence of the modulation and coding scheme indicator field, the new data indicator field, the redundancy version indicator field, and the HARQ process identifier indicator field in the DCI, to obtain 12 bits. If the assistance information indicates the information about the serving cell and the information about the HARQ process simultaneously, when the terminal is configured with A serving cells, initial A bits may be used in a bitmap manner to indicate whether each serving cell need to report, and bits are selected from an $A^{th}$ bit to indicate information about a reported HARQ process. An end of the 12 bits may have a bit that is not actually used (for example, not used for indicating any assistance information), the network side may use the bit to indicate an invalid value or any value based on an implementation, and the terminal side may ignore a value of the bit.

In conclusion, in the embodiments of this application, by triggering assistance information carried in DCI of a one-shot HARQ-ACK codebook and instructing the terminal to perform one-shot HARQ-ACK codebook reporting, the efficiency and reliability of HARQ-ACK reporting are improved, and the flexibility of reporting triggering is improved.

Figure 2:
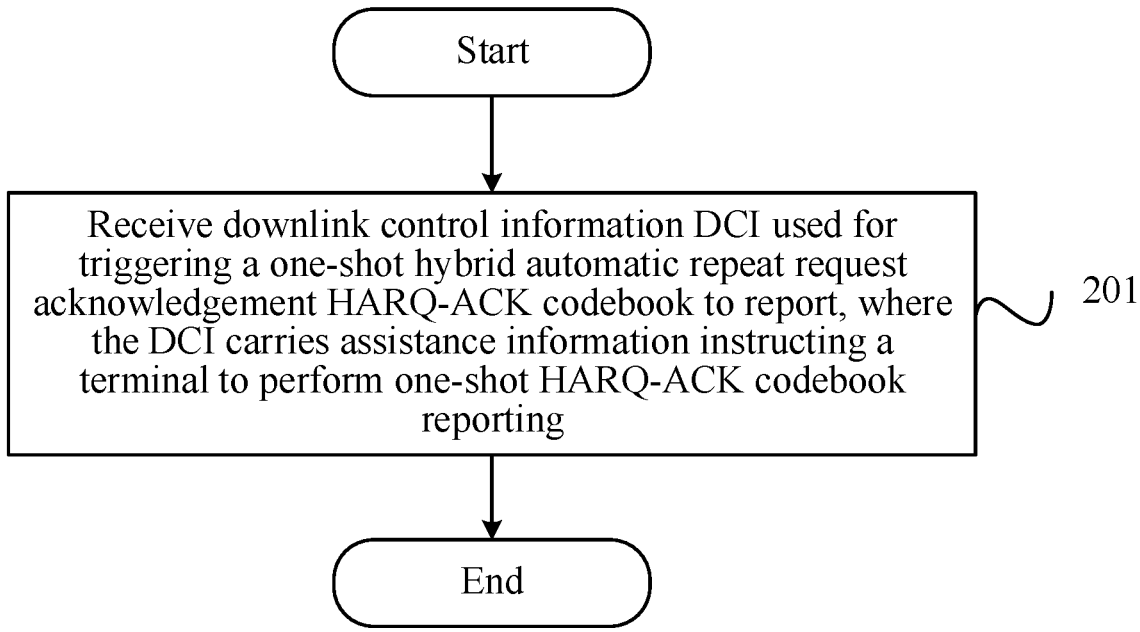
FIG. 2 is a second step flowchart of an information transmission method according to an embodiment of this application.

As shown in FIG. 2, an embodiment of this application further provides an information processing method, applied to a terminal and including:

Step 201. Receive DCI used for triggering a one-shot HARQ-ACK codebook to report, where the DCI carries assistance information instructing a terminal to perform one-shot HARQ-ACK codebook reporting.

In some implementations, the DCI does not schedule a PDSCH (for example, an FDRA field of the DCI is set to a specified value), and the assistance information is indicated through a field related to PDSCH scheduling in the DCI; or the DCI schedules a PDSCH, and the assistance information may be indicated by a newly added field or another field in the DCI in this case.

In some implementations, the assistance information includes at least one of the following:

information about serving cell(s) corresponding to the one-shot HARQ-ACK codebook to be reported, to reduce a number of bits corresponding to the HARQ- ACK codebook, where only HARQ-ACK corresponding to a serving cell (a set or a subset) focused by a network is reported;

information about HARQ process(es) corresponding to the one-shot HARQ-ACK codebook to be reported, to reduce a number of bits corresponding to the HARQ-ACK codebook, where only HARQ-ACK corresponding to a HARQ process (a set or a subset) focused by a network is reported;

information about TB(s) corresponding to the one-shot HARQ-ACK codebook to be reported, to reduce a number of bits corresponding to the HARQ-ACK codebook, where only HARQ-ACK corresponding to a TB (a set or a subset) focused by a network is reported;

information about CBG(s) corresponding to the one-shot HARQ-ACK codebook to be reported, to reduce a number of bits corresponding to the HARQ-ACK codebook, where only HARQ-ACK corresponding to a CBG (a set or a subset) focused by a network is reported; or high-level configuration parameter(s) for the one-shot HARQ-ACK codebook to be reported, to flexibly control an attribute fed back by HARQ-ACK. The high-level configuration parameter indicated herein covers a corresponding high-level configuration parameter configured or indicated by a terminal, and controls or affects organization or generation of the one-shot HARQ-ACK codebook. Generally, a transmission success rate of the DCI is relatively lower than that of an RRC parameter configuration. Therefore, in some implementations, in the embodiments of this application, triggering and reporting are performed by triggering the one-shot HARQ-ACK codebook. In some implementations, whether the DCI indicates the assistance information may be regulated by regulations or configured through the high-level parameter. In some implementations, when the DCI indicates the assistance information, the DCI indicates assistance information that may be regulated by the regulations or configured by the high-level parameter, and for example, the assistance information may include information about serving cell(s) and information about HARQ process(s).

In some implementations, The DCI may also indicate whether the assistance information is included in the DCI. For example, in the DCI, a 1-bit field indicates whether the assistance information is included, "0" identifies that the DCI does not include the assistance information, and "1" identifies that the DCI includes the assistance information. In some implementations, the DCI may also indicate the assistance information included in the DCI. For example, in the DCI, an N-bit field indicates whether each piece of assistance information is included in the DCI. For example, if N is equal to 5 and a bitmap manner is used, each bit and the 5 pieces of assistance information are in a one-to-one correspondence and whether corresponding assistance information is included in the DCI is indicated. For example, a bit value "0" identifies that the DCI does not include the corresponding assistance information, and "1" identifies that the DCI includes the corresponding assistance information.

In some implementations, the information about serving cell(s) corresponding to the one-shot HARQ-ACK codebook to be reported includes at least one of the following:

an index of a first serving cell for which the corresponding HARQ-ACK will be included in the one-shot HARQ-ACK codebook to be reported, where traversing is performed from the first serving cell corresponding to the index to a last (with a greatest index) serving cell configured for the terminal in ascending order of indexes, and serving cell sets (subsets) formed by these serving cells all need to report corresponding HARQ-ACK;

an index of a last serving cell for which the corresponding HARQ-ACK will be included in the one-shot HARQ-ACK codebook to be reported, where traversing is performed from a serving cell 0 (it is assumed that indexes of serving cells are numbered from 0) to a serving cell corresponding to the index of the last serving cell in ascending order of indexes, and serving cell sets (subsets) formed by these serving cells all need to report corresponding HARQ-ACK;

an index of a first serving cell for which the corresponding HARQ-ACK will be included in the one-shot HARQ-ACK codebook to be reported and an index of a last serving cell for which the corresponding HARQ-ACK will be included in the one-shot HARQ-ACK codebook to be reported, where traversing is performed from a serving cell corresponding to the index of the first serving cell to a serving cell corresponding to the index of the last serving cell in ascending order of indexes, and serving cell sets (subsets) formed by these serving cells all need to report corresponding HARQ-ACK;

an index (namely, index1) of a first serving cell for which the corresponding HARQ-ACK will be included in the one-shot HARQ-ACK codebook to be reported and a number (cell_num) of continuous indexes of a serving cell for which the corresponding HARQ-ACK will be included in the one-shot HARQ-ACK codebook to be reported, where traversing is performed from a serving cell corresponding to the index of the first serving cell to a serving cell corresponding to an index (whose value is index1+cellnum−1) in ascending order of indexes, and serving cell sets (subsets) formed by these serving cells (cell_num serving cells in total) all need to report corresponding HARQ-ACK;

first indication information indicating whether each serving cell needs to report HARQ-ACK, where for example, a $N_{cells}^{DL}$-bit ($N_{cells}^{DL}$ is a number of serving cells configured for the terminal) bitmap is used to indicate whether a serving cell corresponding to each index needs to report, when a bit i is set to 1, it indicates that a serving cell i needs to report, and when the bit i is set to 0, it indicates that the serving cell i does not need to report; and serving cell sets (subsets) formed by serving cells whose corresponding bits are set to 1 (namely, indicating a need to report) all need to report corresponding HARQ-ACK; and an index of at least one serving cell set for which the corresponding HARQ-ACK will be included in the one-shot HARQ-ACK codebook to be reported, where in this case, the network side may configure one or a plurality of serving cell sets in advance through RRC, and the DCI explicitly indicates to apply one or a plurality of serving cell sets thereof; and for example, the network configures one serving cell set list for the terminal in advance through RRC dedicated signaling, the list includes one or a plurality of entries (entry), each entry corresponds to one configured serving cell set, the serving cell set includes one or a plurality of different serving cells, a bit is used to indicate an entry index in the DCI, and each serving cell in a serving cell set corresponding to the entry index needs to report corresponding HARQ-ACK.

In some implementations, the information about HARQ process(s) corresponding to the one-shot HARQ-ACK codebook to be reported includes at least one of the following:

an IDentifier (ID) of a first HARQ process for which the corresponding HARQ-ACK will be included in the one-shot HARQ-ACK codebook to be reported, where traversing is performed from a HARQ process corresponding to the identifier of the first HARQ process to a last (with a greatest identifier) HARQ process configured for the terminal in ascending order of identifiers, and HARQ process sets (subsets) formed by theses HARQ processes all need to report corresponding HARQ-ACK;

an identifier of a last HARQ process for which the corresponding HARQ-ACK will be included in the one-shot HARQ-ACK codebook to be reported, where traversing is performed from a HARQ process 0 (it is assumed that identifiers of HARQ processes are numbered from 0) to a HARQ process corresponding to the identifier of the last HARQ process in ascending order of identifiers, and HARQ process sets (subsets) formed by these HARQ processes all need to report corresponding HARQ-ACK;

an identifier of a first HARQ process for which the corresponding HARQ-ACK will be included in the one-shot HARQ-ACK codebook to be reported and an identifier of a last HARQ process for which the corresponding HARQ-ACK will be included in the one-shot HARQ-ACK codebook to be reported, where traversing is performed from a HARQ process corresponding to the identifier of the first HARQ process to a HARQ process corresponding to the identifier of the last HARQ process in ascending order of identifiers, and HARQ process sets (subsets) formed by these HARQ processes all need to report corresponding HARQ-ACK;

an identifier (ID1) of a first HARQ process for which the corresponding HARQ-ACK will be included in the one-shot HARQ-ACK codebook to be reported and a number id_num of continuous identifiers of a HARQ process for which the corresponding HARQ-ACK will be included in the one-shot HARQ-ACK codebook to be reported, where traversing is performed from a HARQ process corresponding to the identifier of the first HARQ process to a HARQ process corresponding to an index (whose value is ID1+idnum−1) in ascending order of identifiers, and HARQ process sets (subsets) formed by these HARQ processes all need to report corresponding HARQ-ACK; and second indication information indicating whether each HARQ process needs to report HARQ-ACK, where for example, a $N_{HARQ,c}^{DL}$-bit ($N_{HARQ,c}^{DL}$ is a number of HARQ processes configured for a serving cell c of the terminal) bitmap is used to indicate whether a HARQ process corresponding to each ID needs to report, when a bit i is set to 1, it indicates that a HARQ process i needs to report, and when the bit i is set to 0, it indicates that the HARQ process i does not need to report; and HARQ process sets (subsets) formed by HARQ processes whose corresponding bits are set to 1 (namely, indicating a need to report) all need to report corresponding HARQ-ACK.

In some implementations, the information about TB(s) corresponding to the one-shot HARQ-ACK codebook to be reported includes at least one of the following:

indicating HARQ-ACK for TB index 0 will be included in the one-shot HARQ-ACK to be reported; or indicating HARQ-ACK for TB index 0 and 1 will be included in the one-shot HARQ-ACK to be reported.

In some implementations, the indicated index of the reported TB is applicable to each HARQ process reported by the one-shot HARQ-ACK codebook.

In some implementations, the indication is provided only when a serving cell (or at least one serving cell) is configured to support double codewords at most.

For example, 1 bit is used for indication, a value 0 indicates only to report HARQ-ACK for a TB index 0, and a value 1 indicates to report HARQ-ACK for both the TB index 0 and a TB index 1 simultaneously.

In some implementations, the information about CBG(s) corresponding to the one-shot HARQ-ACK codebook to be reported includes:

a maximum index of the CBG(s) corresponding to the one-shot HARQ-ACK codebook to be reported.

The terminal only report, for a TB index of a HARQ process of a serving cell, HARQ-ACK corresponding to each CBG within a range determined from an index 0 to the indicated maximum index. In some implementations, the information of the CBG is only applicable to a serving cell enabling CBG feedback and retransmission, such as a serving cell providing a high-level configuration parameter maxCodeBlockGroupsPerTransportBlock. In some implementations, the indication is provided only when a serving cell (or at least one serving cell) enables CBG-based feedback and retransmission and the terminal is also configured to enable CBG granularity-based one-shot HARQ-ACK codebook reporting (for example, the terminal is configured with a high-level parameter pdsch-HARQ-ACK-OneShot-FeedbackCBG-r16).

In some implementations, the high-level configuration parameter(s) for the one-shot HARQ-ACK codebook to be reported includes at least one of the following:

third indication information indicating whether to enable spatial bundling when the HARQ-ACK codebook is carried on a Physical Uplink Control CHannel (PUCCH);

fourth indication information indicating whether to enable spatial bundling when the HARQ-ACK codebook is carried on a Physical Uplink Shared CHannel (PUSCH);

fifth indication information indicating whether to enable HARQ-ACK feedback of a CBG granularity; or sixth indication information indicating whether to report NDI information in the one-shot HARQ-ACK codebook.

In some implementations, the third indication information is included in the DCI only when a serving cell (or at least one serving cell) is configured to support double codewords at most. In some implementations, the third indication information may be indicated by using 1 bit.

In some implementations, the fourth indication information is included in the DCI only when a serving cell (or at least one serving cell) is configured to support double codewords at most. In some implementations, the fourth indication information may be indicated by using 1 bit.

In some implementations, the fifth indication information is included in the DCI only when a serving cell (or at least one serving cell) enables CBG-based feedback and retransmission. In some implementations, the fifth indication information may be indicated by using 1 bit.

In some implementations, the sixth indication information may be indicated by using 1 bit.

In some implementations, the assistance information is carried in the DCI through a first indicator field; and the first indicator field satisfies at least one of the following conditions:
an indicator field that is not used and exists in the DCI;
an indicator field with a fixed number of bits; or
an indicator field both existing in a first DCI format and existing in a second DCI format, where the first DCI format is a format (for example, a DCI format 1_1) corresponding to the DCI triggering the one-shot HARQ-ACK codebook, and the second DCI format is a format (for example, DCI format 1_0) corresponding to DCI not used for triggering the one-shot HARQ-ACK codebook.

In some implementations, the indicator field that is not used and exists in the DCI may further be: an indicator field that is not used and exists in the DCI when the DCI does not schedule a PDSCH.

For example, the first indicator field satisfying at least two of the foregoing conditions includes any one of the following cases:
an indicator field that is not used and exists in the DCI with a fixed number of bits;
an indicator field that is not used and exists in the DCI with a fixed number of bits when the DCI does not schedule a PDSCH;
an indicator field that is not used and exists in the DCI and both exists in the first DCI format and exists in the second DCI format;
an indicator field that is not used and exists in the DCI and both exists in the first DCI format and exists in the second DCI format when the DCI does not schedule a PDSCH;
an indicator field that is not used and exists in the DCI and both exists in the first DCI format and exists in the second DCI format with a fixed number of bits; or
an indicator field that is not used and exists in the DCI and both exists in the first DCI format and exists in the second DCI format with a fixed number of bits when the DCI does not schedule a PDSCH.

In some implementations, the first indicator field includes at least one of the following:
a time domain resource assignment indicator field;
a Virtual Resource Block (VRB) to Physical Resource Block (PRB) mapping indicator field;
a Modulation and Coding Scheme (MCS) indicator field;
a New Data Indicator (NDI) field;
a Redundancy Version (RV) indicator field;
a HARQ process identifier indicator field; or
a Downlink Assignment Index (DAI) indicator field.

For the time domain resource assignment indicator field, the field includes 4 bits in the DCI format 1_0, and the field may include 0, 1, 2, 3, or 4 bits in the DCI format 1_1.

For the VRB to PRB mapping indicator field, the field includes 1 bit in the DCI format 1_0, and the field may include 0 bit in the DCI format 1_1.

For the MCS indicator field, the field includes 5 bits in the DCI format 1_0, and in the DCI format 1_1, an MCS indicator field used for a transport block 1 may be selected, which also includes 5 bits.

For the NDI indicator field, the field includes 1 bit in the DCI format 1_0, and in the DCI format 1_1, an NDI indicator field used for a transport block 1 may be selected, which also includes 1 bit.

For the RV indicator field, the field includes 2 bits in the DCI format 1_0, and in the DCI format 1_1, an RV indicator field used for a transport block 1 may be selected, which also includes 2 bits.

The HARQ process identifier indicator field fixedly includes 4 bits.

For the DAI indicator field, the field includes 2 bits in the DCI format 1_0, and the field may include 0, 2, or 4 bits in the DCI format 1_1.

For example, the information about the serving cell may be indicated by using the modulation and coding scheme indicator field (or initial N bits of the field).

In another example, the information about the HARQ process may be indicated by using the HARQ process identifier indicator field. For example, an identifier of a first or a last HARQ process for which the corresponding HARQ-ACK will be included in the one-shot HARQ-ACK codebook to be reported is indicated by using the HARQ process identifier indicator field, or when a number M of configured HARQ processes does not exceed 4, HARQ processes that need to report are indicated by using first M bits of the field.

In some implementations of this application, the assistance information is carried in the DCI through at least one second indicator field; and
the second indicator field is an information indicator field obtained by dividing a bit sequence corresponding to a third indicator field in the DCI according to the assistance information.

The third indicator field satisfies at least one of the following conditions:
an indicator field that is not used and exists in the DCI;
an indicator field with a fixed number of bits; or
an indicator field both existing in a first DCI format and existing in a second DCI format, where the first DCI format is a format (for example, a DCI format 1_1) corresponding to the DCI triggering the one-shot HARQ-ACK codebook, and the second DCI format is a format (for example, DCI format 1_0) corresponding to DCI not used for triggering the one-shot HARQ-ACK codebook.

In some implementations, the indicator field that is not used and exists in the DCI may further be: an indicator field that is not used and exists in the DCI when the DCI does not schedule a PDSCH.

For example, the third indicator field satisfying at least two of the foregoing conditions includes any one of the following cases:
an indicator field that is not used and exists in the DCI with a fixed number of bits;
an indicator field that is not used and exists in the DCI with a fixed number of bits when the DCI does not schedule a PDSCH;
an indicator field that is not used and exists in the DCI and both exists in the first DCI format and exists in the second DCI format;
an indicator field that is not used and exists in the DCI and both exists in the first DCI format and exists in the second DCI format when the DCI does not schedule a PDSCH;
an indicator field that is not used and exists in the DCI and both exists in the first DCI format and exists in the second DCI format with a fixed number of bits; or
an indicator field that is not used and exists in the DCI and both exists in the first DCI format and exists in the second DCI format with a fixed number of bits when the DCI does not schedule a PDSCH.

In some implementations, the third indicator field includes at least one of the following:
a Virtual Resource Block (VRB) to Physical Resource Block (PRB) mapping indicator field;

a Modulation and Coding Scheme (MCS) indicator field;
a New Data Indicator (NDI) field;
a Redundancy Version (RV) indicator field;
a HARQ process identifier indicator field; or
a Downlink Assignment Index (DAI) indicator field.

The third indicator field herein may be a single selected indicator field or a plurality of selected indicator fields. When the third indicator field only involves a single indicator field, the bit sequence corresponding to the third indicator field may directly correspond to a bit sequence occupied by the single indicator field; and when the third indicator field corresponds to a plurality of indicator fields, the bit sequence corresponding to the third indicator field may be a total bit sequence obtained by connecting bit sequences corresponding to the plurality of indicator fields end to end.

The third indicator field satisfies at least one of the following conditions:
  an indicator field that is not used and exists in the DCI;
  an indicator field with a fixed number of bits; or
  an indicator field both existing in a first DCI format and existing in a second DCI format, where the first DCI format is a format (for example, a DCI format 1_1) corresponding to the DCI triggering the one-shot HARQ-ACK codebook, and the second DCI format is a format (for example, DCI format 1_0) corresponding to DCI not used for triggering the one-shot HARQ-ACK codebook.

In some implementations, the indicator field that is not used and exists in the DCI may further be: an indicator field that is not used and exists in the DCI when the DCI does not schedule a PDSCH.

For example, when the bit sequences of the plurality of bit sequences corresponding to the third indicator field are connected end to end, connection may be performed according to an occurrence sequence of the plurality of indicator fields in the DCI or a sequence of an agreement or a high-level configuration, to obtain the bit sequence corresponding to the third indicator field.

The bit sequence corresponding to the third indicator field may be sequentially used for indicating the assistance information according to a configured or agreed sequence. For example, corresponding bits are sequentially connected according to an occurrence sequence of the modulation and coding scheme indicator field, the new data indicator field, the redundancy version indicator field, and the HARQ process identifier indicator field in the DCI, to obtain 12 bits. If the assistance information indicates the information about the serving cell and the information about the HARQ process simultaneously, when the terminal is configured with A serving cells, initial A bits may be used in a bitmap manner to indicate whether each serving cell need to report, and bits are selected from an $A^{th}$ bit to indicate information about a reported HARQ process. An end of the 12 bits may have a bit that is not actually used (for example, not used for indicating any assistance information), the network side may use the bit to indicate an invalid value or any value based on an implementation, and the terminal side may ignore a value of the bit.

In conclusion, in the embodiments of this application, by triggering assistance information carried in DCI of a one-shot HARQ-ACK codebook and instructing the terminal to perform one-shot HARQ-ACK codebook reporting, the efficiency and reliability of HARQ-ACK reporting are improved, and the flexibility of reporting triggering is improved.

Figure 3:
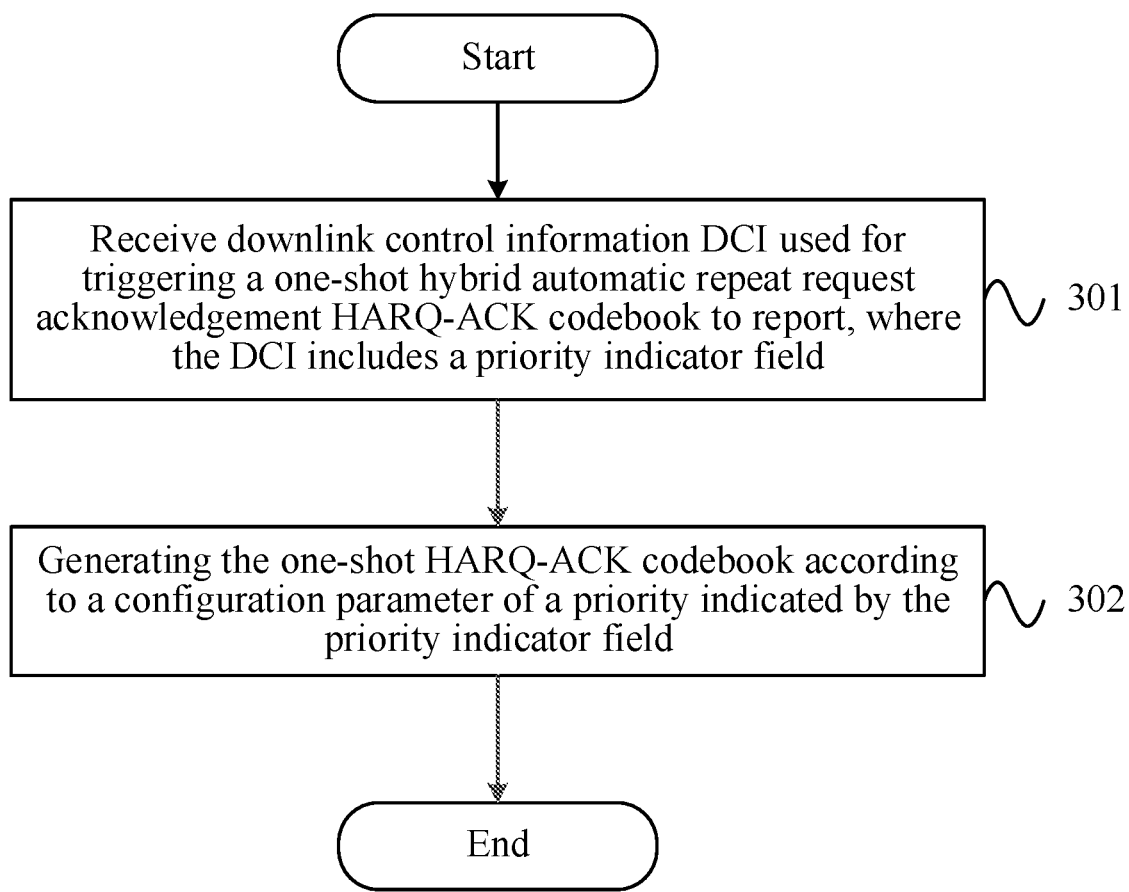
FIG. 3 is a step flowchart of a method for determining a HARQ-ACK codebook according to an embodiment of this application.

As shown in FIG. 3, an embodiment of this application further provides a method for determining a HARQ-ACK codebook, applied to a terminal and including:
  Step 301. Receive DCI used for triggering a one-shot HARQ-ACK codebook to report, where the DCI includes a priority indicator field.
  Step 302. Generate the one-shot HARQ-ACK codebook according to a configuration parameter of a priority indicated by the priority indicator field.

In the embodiments of this application, to distinguish transmission requirements with different priorities, for one-shot HARQ-ACK feedback (one-shot HARQ-ACK codebook), configuration parameters corresponding to various priorities may be configured to distinguish the priorities, and for example, corresponding one-shot HARQ-ACK codebook feedback related parameters are respectively configured for priority indexes 0/1. When the network configures two codebooks for the terminal, a priority indicator field may exist in a DCI format (for example, the DCI format 1_1) for indicating priority indexes corresponding to HARQ-ACK feedback and an associated PUCCH transmission. In this case, if the DCI format triggers reporting of the one-shot HARQ-ACK codebook, the terminal generates the one-shot HARQ-ACK codebook according to the configuration parameter of the priority indicated by the priority indicator field.

In some implementations, step 302 includes:
  setting HARQ-ACK information of each HARQ process according to a PDSCH decoding result of each HARQ process. In other words, the terminal feeds back HARQ-ACK for each HARQ process that needs to report. The HARQ process that needs to report may be all HARQ processes configured in a downlink direction in each serving cell configured for the terminal, or may be each HARQ process that needs to report after a HARQ-ACK reporting range is adjusted based on the assistance information indicated in the DCI of the triggered one-shot HARQ-ACK codebook. The DCI in the triggered one-shot HARQ-ACK codebook may further indicate the assistance information, and for related description of organizing (including adjusting or limiting the HARQ-ACK reporting range) the one-shot HARQ-ACK codebook based on one piece of or a plurality of pieces of indicated assistance information, reference may be made to the description of the corresponding embodiments above, which is not described in detail herein.

In some implementations, when a HARQ process schedules a PDSCH recently but has not time to decode the PDSCH, the terminal may set HARQ-ACK of the HARQ process to NACK or fill in HARQ-ACK of most recent PDSCH reception of the same HARQ process before the PDSCH is received. The HARQ-ACK herein may be a decoding result of a corresponding PDSCH or may be a value set based on a reporting rule (for example, when NDI information is not carried in the one-shot HARQ-ACK codebook, after the terminal reports an actual decoding result of a received PDSCH, if a subsequent new PDSCH for a corresponding HARQ process is not detected/received, NACK is reported for the HARQ process in a later one-shot HARQ-ACK codebook reporting opportunity).

In some implementations, step 302 includes:
  setting HARQ-ACK of a first HARQ process to a valid value; and
  resetting HARQ-ACK of other HARQ processes other than the first HARQ process to Negative ACKnowledge (NACK), where most recent Physical Downlink Shared CHannel (PDSCH) reception of the first HARQ process corresponds to a priority index in a first priority index set. The PDSCH (assumed as PDSCH1) herein corresponds to a priority index (assumed as Index1), which may be understood as that: DCI of the PDSCH (namely, PDSCH1) is scheduled to indicate the priority index (namely, Index1) through a priority indicator field, or when no priority indicator field is included in the scheduled DCI, the PDSCH is caused to correspond to the priority index through a pre-defined rule (for example, all PDSCHs scheduled by DCI not including a priority indicator field correspond to a priority index 0).

In some implementations, the most recent PDSCH reception refers to a last PDSCH detected/received for the corresponding HARQ process before one-shot codebook transmission; or the most recent PDSCH reception refers to a last PDSCH satisfying a terminal processing delay requirement and detected and received for the corresponding HARQ process before one-shot codebook transmission. The terminal processing delay requirement may be dynamically indicated through a terminal capability, high-level configurations, or DCI. For example, the terminal processing delay requirement may be a terminal processing delay requirement corresponding to a priority index indicated by a priority indicator field in DCI triggering one-shot codebook transmission.

For example, the terminal only sets HARQ-ACK of a HARQ process corresponding to a specified priority index or priority index set in the most recent PDSCH reception as a valid value and resets HARQ-ACK of other HARQ processes to NACK.

It may be understood that, a HARQ process set formed by the first HARQ process and other HARQ processes other than the first HARQ process is a HARQ process that needs to report for the one-shot HARQ-ACK codebook. The HARQ process that needs to report may be all HARQ processes configured in a downlink direction in each serving cell configured for the terminal, or may be each HARQ process that needs to report after a HARQ-ACK reporting range is adjusted based on the assistance information indicated in the DCI of the triggered one-shot HARQ-ACK codebook. The DCI in the triggered one-shot HARQ-ACK codebook may further indicate the assistance information, and for related description of organizing (including adjusting or limiting the HARQ-ACK reporting range) the one-shot HARQ-ACK codebook based on one piece of or a plurality of pieces of indicated assistance information, reference may be made to the description of the corresponding embodiments above, which is not described in detail herein.

The first priority index set includes at least one priority index; and
  the first priority index set is determined by a priority index indicated by the priority indicator field of the DCI.

For example, the first priority index set includes one priority index, and the priority index is the priority index indicated by the priority indicator field of the DCI.

In another example, the first priority index set includes one or two priority indexes, if the priority index indicated by the priority indicator field is a priority index 0, the first priority index set includes the priority index 0 and a priority index 1, namely, the terminal reports valid HARQ-ACK information corresponding to all priority indexes (the priority indexes and the priorities are in a one-to-one correspondence). If the priority index indicated by the priority indicator field is a priority index 1, the first priority index set only includes the priority index 1, namely, the terminal only reports valid HARQ-ACK information corresponding to the priority index 1.

Further, after step 302, the method further includes:
  transmitting, according to the configuration parameter of the priority indicated by the priority indicator field of the DCI, a physical uplink control channel PUCCH or a physical uplink shared channel PUSCH carrying the one-shot HARQ-ACK codebook.

Transmission of the one-shot HARQ-ACK codebook does not affect PUCCH/PUSCH transmission (including priority indexes and related configuration parameters organized by the HARQ-ACK codebook and to which the PUCCH/PUSCH transmission is applied) within a HARQ-ACK feedback opportunity determined by the PDSCH before the one-shot HARQ-ACK codebook is triggered, unless the transmission of the one-shot HARQ-ACK codebook and the HARQ-ACK feedback opportunity determined previously fall within a same slot or sub-slot. In this case, only the one-shot HARQ-ACK codebook is transmitted, and HARQ-ACK feedback corresponding to the HARQ-ACK feedback opportunity determined previously is ignored.

In some implementations, the configuration parameter includes at least one of the following:
  seventh indication information indicating whether to enable HARQ-ACK feedback of a CBG granularity;
  eighth indication information indicating whether to report NDI information in the one-shot HARQ-ACK codebook;
  ninth indication information indicating whether to enable spatial bundling when the HARQ-ACK codebook is carried on the PUCCH; or
  tenth indication information indicating whether to enable spatial bundling when the HARQ-ACK codebook is carried on the PUSCH.

Further, in some implementations, in a case that the DCI further includes overriding parameter(s), each of which will overrid the corresponding configuration parameter, step 302 includes:
  generating the one-shot HARQ-ACK codebook according to the overriding parameter(s);
  or
  generating the one-shot HARQ-ACK codebook according to the overriding parameter(s) in a case of determining that the overriding parameter(s) are valid according to the priority index indicated by the priority indicator field of the DCI. For example, the overriding parameter (s) are valid only when the priority index is a value, to better control HARQ-ACK feedback overheads of services with a high priority. The value of the priority index may be determined through pre-definition or high-level configuration.

In conclusion, in the embodiments of this application, the one-shot HARQ-ACK codebook is generated and transmitted according to the configuration parameter of the priority indicated by the priority indicator field, so that the efficiency and reliability of codebook generation and reporting can be improved.

Figure 4:
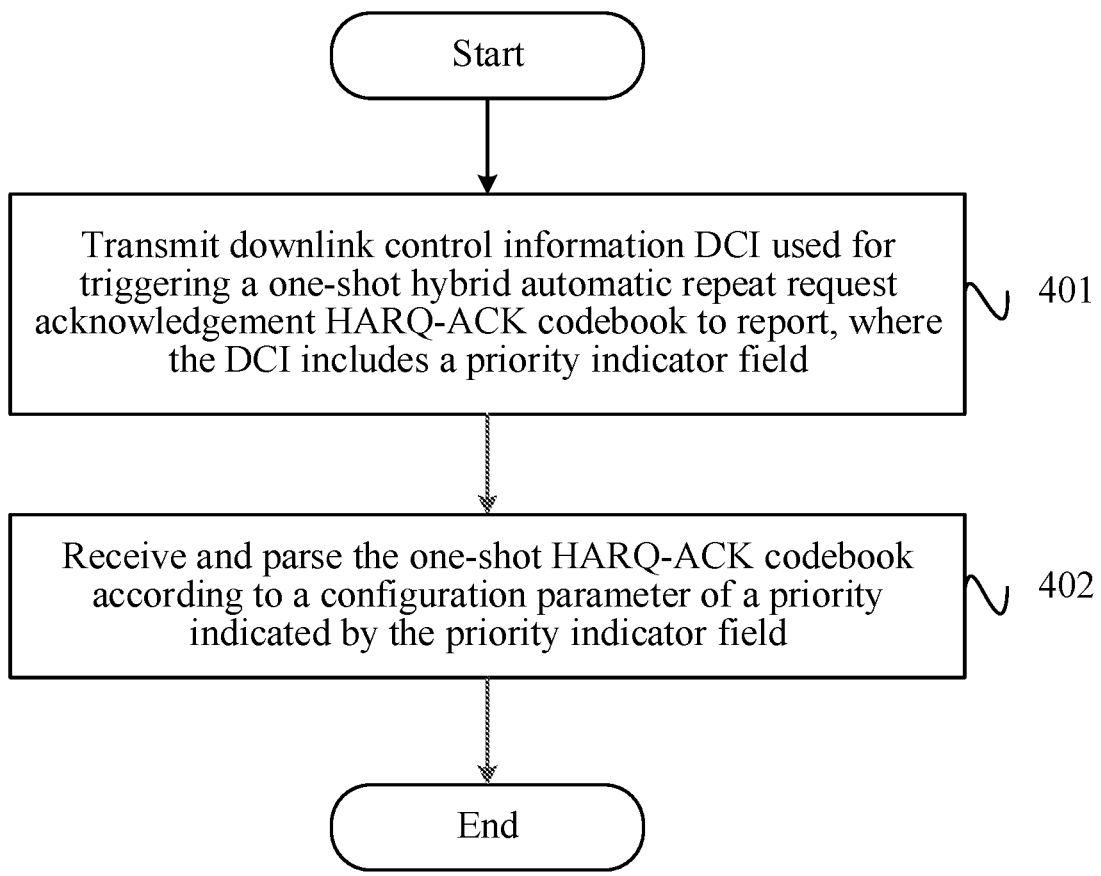
FIG. 4 is a step flowchart of a method for transmitting a HARQ-ACK codebook according to an embodiment of this application.

As shown in FIG. 4, an embodiment of this application further provides a method for transmitting a HARQ-ACK codebook, applied to a network-side device and including:
  Step 401. Transmit downlink control information DCI used for triggering a one-shot HARQ-ACK codebook to report, where the DCI includes a priority indicator field.
  Step 402. Receive and parse the one-shot HARQ-ACK codebook according to a configuration parameter of a priority indicated by the priority indicator field. In the embodiments of this application, to distinguish transmission requirements with different priorities, for one-shot HARQ-ACK feedback (one-shot HARQ-ACK codebook), configuration parameters corresponding to various priorities may be configured to distinguish the priorities, and for example, corresponding one-shot HARQ-ACK codebook feedback related parameters are respectively configured for priority indexes 0/1. When the network configures two codebooks for the terminal, a priority indicator field may exist in a DCI format (for example, the DCI format 1_1) for indicating priority indexes corresponding to HARQ-ACK feedback and an associated PUCCH transmission. In this case, if the DCI format triggers reporting of the one-shot HARQ-ACK codebook, the network-side device receives and parses the one-shot HARQ-ACK codebook according to the configuration parameter of the priority indicated by the priority indicator field.

In some implementations, step 402 includes:
  receiving, according to the configuration parameter of the priority indicated by the priority indicator field, a PUCCH or a PUSCH carrying the one-shot HARQ-ACK codebook.

Transmission of the one-shot HARQ-ACK codebook does not affect PUCCH/PUSCH transmission (including priority indexes and related configuration parameters organized by the HARQ-ACK codebook and to which the PUCCH/PUSCH transmission is applied) within a HARQ-ACK feedback opportunity determined by the PDSCH before the one-shot HARQ-ACK codebook is triggered, unless the transmission of the one-shot HARQ-ACK codebook and the HARQ-ACK feedback opportunity determined previously fall within a same slot or sub-slot. In this case, only the one-shot HARQ-ACK codebook is transmitted, and HARQ-ACK feedback corresponding to the HARQ-ACK feedback opportunity determined previously is ignored.

In some implementations, the configuration parameter includes at least one of the following:
  seventh indication information indicating whether to enable HARQ-ACK feedback of a CBG granularity;
  eighth indication information indicating whether to report NDI information in the one-shot HARQ-ACK codebook;
  ninth indication information indicating whether to enable spatial bundling when the HARQ-ACK codebook is carried on the PUCCH; or
  tenth indication information indicating whether to enable spatial bundling when the HARQ-ACK codebook is carried on the PUSCH.

Further, in some implementations, the DCI further includes overriding parameter(s), each of which will overrid the corresponding configuration parameter. In a case that the DCI further includes the overriding parameter(s), each of which will overrid the corresponding configuration parameter, the terminal may generate the one-shot HARQ-ACK codebook according to the overriding parameter(s).

In conclusion, in the embodiments of this application, the one-shot HARQ-ACK codebook is received and parsed according to the configuration parameter of the priority indicated by the priority indicator field, so that the efficiency and reliability of codebook transmission can be improved.

Figure 5:
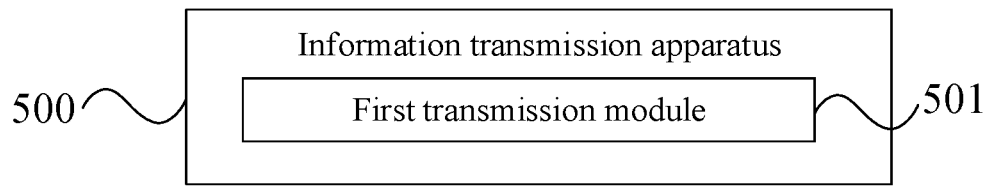
FIG. 5 is a first schematic structural diagram of an information transmission apparatus according to an embodiment of this application.

As shown in FIG. 5, an embodiment of this application further provides an information processing apparatus 500, applied to a network-side device and including:
  a first transmission module 501, configured to transmit DCI used for triggering a one-shot HARQ-ACK codebook to report, where the DCI carries assistance information instructing a terminal to perform one-shot HARQ-ACK codebook reporting.

In some implementations, in some implementations, the assistance information includes at least one of the following:
  information about serving cell(s) corresponding to the one-shot HARQ-ACK codebook to be reported;
  information about HARQ process(es) corresponding to the one-shot HARQ-ACK codebook to be reported;
  information about TB(s) corresponding to the one-shot HARQ-ACK codebook to be reported;
  information about CBG(s) corresponding to the one-shot HARQ-ACK codebook to be reported; or
  high-level configuration parameter(s) for the one-shot HARQ-ACK codebook to be reported.

In some implementations, in some implementations, the information about serving cell(s) corresponding to the one-shot HARQ-ACK codebook to be reported includes at least one of the following:
  an index of a first serving cell for which the corresponding HARQ-ACK will be included in the one-shot HARQ-ACK codebook to be reported;
  an index of a last serving cell for which the corresponding HARQ-ACK will be included in the one-shot HARQ-ACK codebook to be reported;
  an index of a first serving cell for which the corresponding HARQ-ACK will be included in the one-shot HARQ-ACK codebook to be reported and an index of a last serving cell for which the corresponding HARQ-ACK will be included in the one-shot HARQ-ACK codebook to be reported;
  an index of a first serving cell for which the corresponding HARQ-ACK will be included in the one-shot HARQ-ACK codebook to be reported and a number of continuous indexes of a serving cell for which the corresponding HARQ-ACK will be included in the one-shot HARQ-ACK codebook to be reported;
  first indication information indicating whether each serving cell needs to report HARQ-ACK; or
  an index of at least one serving cell set for which the corresponding HARQ-ACK will be included in the one-shot HARQ-ACK codebook to be reported.

In some implementations, in some implementations, the information about HARQ process(es) corresponding to the one-shot HARQ-ACK codebook to be reported includes at least one of the following:
  an identifier of a first HARQ process for which the corresponding HARQ-ACK will be included in the one-shot HARQ-ACK codebook to be reported;
  an identifier of a last HARQ process for which the corresponding HARQ-ACK will be included in the one-shot HARQ-ACK codebook to be reported;
  an identifier of a first HARQ process for which the corresponding HARQ-ACK will be included in the one-shot HARQ-ACK codebook to be reported and an identifier of a last HARQ process for which the corresponding HARQ-ACK will be included in the one-shot HARQ-ACK codebook to be reported;
  an identifier of a first HARQ process for which the corresponding HARQ-ACK will be included in the one-shot HARQ-ACK codebook to be reported and a number of continuous identifiers of a HARQ process for which the corresponding HARQ-ACK will be included in the one-shot HARQ-ACK codebook to be reported; or
  second indication information indicating whether each HARQ process needs to report HARQ-ACK.

In some implementations, in some implementations, the information about TB(s) corresponding to the one-shot HARQ-ACK codebook to be reported includes at least one of the following:
  indicating HARQ-ACK for TB index 0 will be included in the one-shot HARQ-ACK to be reported; or
  indicating HARQ-ACK for TB index 0 and 1 will be included in the one-shot HARQ-ACK to be reported.

In some implementations, in some implementations, the information about CBG(s) corresponding to the one-shot HARQ-ACK codebook to be reported includes:
  a maximum index of the CBG(s) corresponding to the one-shot HARQ-ACK codebook to be reported.

In some implementations, in some implementations, the high-level configuration parameter(s) for the one-shot HARQ-ACK codebook to be reported includes at least one of the following:
  third indication information indicating whether to enable spatial bundling when the HARQ-ACK codebook is carried on a PUCCH;
  fourth indication information indicating whether to enable spatial bundling when the HARQ-ACK codebook is carried on a PUSCH;
  fifth indication information indicating whether to enable HARQ-ACK feedback of a CBG granularity; or
  sixth indication information indicating whether to report NDI information in the one-shot HARQ-ACK codebook.

In some implementations, in some implementations, the assistance information is carried in the DCI through a first indicator field; and
  the first indicator field satisfies at least one of the following conditions:
  an indicator field that is not used and exists in the DCI;
  an indicator field with a fixed number of bits; or
  an indicator field both existing in a first DCI format and existing in a second DCI format.

In some implementations, in some implementations, the first indicator field includes at least one of the following:
  a time domain resource assignment indicator field;
  a VRB to PRB mapping indicator field;
  a modulation and coding scheme indicator field;
  a new data indicator field;
  a redundancy version indicator field;
  a HARQ process identifier indicator field; or
  a downlink assignment index indicator field.

In some implementations, in some implementations, the assistance information is carried in the DCI through at least one second indicator field; and
  the second indicator field is an information indicator field obtained by dividing a bit sequence corresponding to a third indicator field in the DCI according to the assistance information, where
  the third indicator field includes at least one of the following:
  a time domain resource assignment indicator field;
  a VRB to PRB mapping indicator field;
  a modulation and coding scheme indicator field;
  a new data indicator field;
  a redundancy version indicator field;
  a HARQ process identifier indicator field; or
  a downlink assignment index indicator field.

In the embodiments of this application, by triggering assistance information carried in DCI of a one-shot HARQ-ACK codebook and instructing the terminal to perform one-shot HARQ-ACK codebook reporting, the efficiency and reliability of HARQ-ACK reporting are improved, and the flexibility of reporting triggering is improved.

It should be noted that, the information transmission apparatus provided in the embodiments of this application is an apparatus that can perform the foregoing information transmission method, all embodiments of the foregoing information transmission method are applicable to the apparatus, and same or similar beneficial effects can all be achieved.

Figure 6:
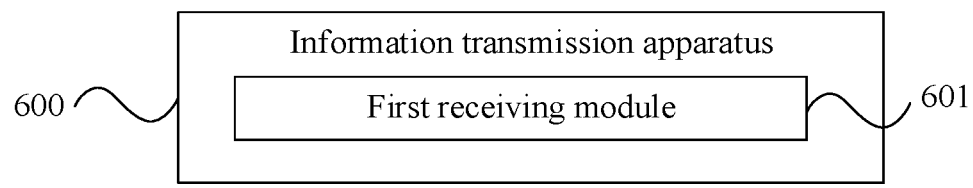
FIG. 6 is a second schematic structural diagram of an information transmission apparatus according to an embodiment of this application.

As shown in FIG. 6, an embodiment of this application further provides an information transmission apparatus 600, applied to a terminal and including:
  a first receiving module 601, configured to receive DCI used for triggering a one-shot HARQ-ACK codebook to report, where
  the DCI carries assistance information instructing a terminal to perform one-shot HARQ-ACK codebook reporting.

In some implementations, the assistance information includes at least one of the following:
  information about serving cell(s) corresponding to the one-shot HARQ-ACK codebook to be reported;
  information about HARQ process(es) corresponding to the one-shot HARQ-ACK codebook to be reported;
  information about TB(s) corresponding to the one-shot HARQ-ACK codebook to be reported;
  information about CBG(s) corresponding to the one-shot HARQ-ACK codebook to be reported; or
  high-level configuration parameter(s) for the one-shot HARQ-ACK codebook to be reported.

In some implementations, the information about serving cell(s) corresponding to the one-shot HARQ-ACK codebook to be reported includes at least one of the following:
  an index of a first serving cell for which the corresponding HARQ-ACK will be included in the one-shot HARQ-ACK codebook to be reported;
  an index of a last serving cell for which the corresponding HARQ-ACK will be included in the one-shot HARQ-ACK codebook to be reported;
  an index of a first serving cell for which the corresponding HARQ-ACK will be included in the one-shot HARQ-ACK codebook to be reported and an index of a last serving cell for which the corresponding HARQ-ACK will be included in the one-shot HARQ-ACK codebook to be reported;
  an index of a first serving cell for which the corresponding HARQ-ACK will be included in the one-shot HARQ-ACK codebook to be reported and a number of continuous indexes of a serving cell for which the corresponding HARQ-ACK will be included in the one-shot HARQ-ACK codebook to be reported;
  first indication information indicating whether each serving cell needs to report HARQ-ACK; or
  an index of at least one serving cell set for which the corresponding HARQ-ACK will be included in the one-shot HARQ-ACK codebook to be reported.

In some implementations, in some implementations, the information about HARQ process(es) corresponding to the one-shot HARQ-ACK codebook to be reported includes at least one of the following:
  an identifier of a first HARQ process for which the corresponding HARQ-ACK will be included in the one-shot HARQ-ACK codebook to be reported;
  an identifier of a last HARQ process for which the corresponding HARQ-ACK will be included in the one-shot HARQ-ACK codebook to be reported;

an identifier of a first HARQ process for which the corresponding HARQ-ACK will be included in the one-shot HARQ-ACK codebook to be reported and an identifier of a last HARQ process for which the corresponding HARQ-ACK will be included in the one-shot HARQ-ACK codebook to be reported;

an identifier of a first HARQ process for which the corresponding HARQ-ACK will be included in the one-shot HARQ-ACK codebook to be reported and a number of continuous identifiers of a HARQ process for which the corresponding HARQ-ACK will be included in the one-shot HARQ-ACK codebook to be reported; or second indication information indicating whether each HARQ process needs to report HARQ-ACK.

In some implementations, in some implementations, the information about TB(s) corresponding to the one-shot HARQ-ACK codebook to be reported includes at least one of the following:

indicating HARQ-ACK for TB index 0 will be included in the one-shot HARQ-ACK to be reported; or indicating HARQ-ACK for TB index 0 and 1 will be included in the one-shot HARQ-ACK to be reported.

In some implementations, in some implementations, the information about CBG(s) corresponding to the one-shot HARQ-ACK codebook to be reported includes:

a maximum index of the CBG(s) corresponding to the one-shot HARQ-ACK codebook to be reported.

In some implementations, in some implementations, the high-level configuration parameter(s) for the one-shot HARQ-ACK codebook to be reported includes at least one of the following:

third indication information indicating whether to enable spatial bundling when the HARQ-ACK codebook is carried on a PUCCH;

fourth indication information indicating whether to enable spatial bundling when the HARQ-ACK codebook is carried on a PUSCH;

fifth indication information indicating whether to enable HARQ-ACK feedback of a CBG granularity; or sixth indication information indicating whether to report NDI information in the one-shot HARQ-ACK codebook.

In some implementations, the assistance information is carried in the DCI through a first indicator field; and the first indicator field satisfies at least one of the following conditions:

an indicator field that is not used and exists in the DCI;

an indicator field with a fixed number of bits; or an indicator field both existing in a first DCI format and existing in a second DCI format.

In some implementations, the first indicator field includes at least one of the following:

a time domain resource assignment indicator field;

a VRB to PRB mapping indicator field;

a modulation and coding scheme indicator field;

a new data indicator field;

a redundancy version indicator field;

a HARQ process identifier indicator field; or a downlink assignment index indicator field.

In some implementations, the assistance information is carried in the DCI through at least one second indicator field; and the second indicator field is an information indicator field obtained by dividing a bit sequence corresponding to a third indicator field in the DCI according to the assistance information, where the third indicator field includes at least one of the following:

a time domain resource assignment indicator field;

a VRB to PRB mapping indicator field;

a modulation and coding scheme indicator field;

a new data indicator field;

a redundancy version indicator field;

a HARQ process identifier indicator field; or a downlink assignment index indicator field.

In the embodiments of this application, by triggering assistance information carried in DCI of a one-shot HARQ-ACK codebook and instructing the terminal to perform one-shot HARQ-ACK codebook reporting, the efficiency and reliability of HARQ-ACK reporting are improved, and the flexibility of reporting triggering is improved.

It should be noted that, the information transmission apparatus provided in the embodiments of this application is an apparatus that can perform the foregoing information transmission method, all embodiments of the foregoing information transmission method are applicable to the apparatus, and same or similar beneficial effects can all be achieved.

Figure 7:
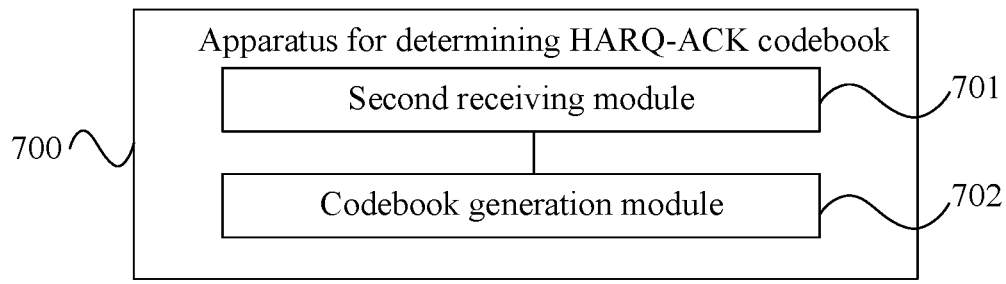
FIG. 7 is a schematic structural diagram of an apparatus for determining a HARQ-ACK codebook according to an embodiment of this application.

As shown in FIG. 7, an embodiment of this application further provides an apparatus 700 for determining a HARQ-ACK codebook, applied to a terminal and including:

a second receiving module 701, configured to receive downlink control information DCI used for triggering a one-shot HARQ-ACK codebook to report, where the DCI includes a priority indicator field; and a codebook generation module 702, configured to generate the one-shot HARQ-ACK codebook according to a configuration parameter of a priority indicated by the priority indicator field.

In some implementations, the codebook generation module includes:

a first submodule, configured to set HARQ-ACK of a first HARQ process to a valid value; and a second submodule, configured to reset HARQ-ACK of other HARQ processes other than the first HARQ process to NACK, where most recent PDSCH reception of the first HARQ process corresponds to a priority index in a first priority index set.

In some implementations, the codebook generation module includes:

a third submodule, configured to set HARQ-ACK information of each HARQ process according to a PDSCH decoding result of each HARQ process.

In some implementations, the first priority index set includes at least one priority index; and the first priority index set is determined by a priority index indicated by the priority indicator field of the DCI.

In some implementations, the apparatus further includes:

a first transmission module, configured to transmit, according to the configuration parameter of the priority indicated by the priority indicator field of the DCI, a PUCCH or a PUSCH carrying the one-shot HARQ-ACK codebook.

In some implementations, the configuration parameter includes at least one of the following:

seventh indication information indicating whether to enable HARQ-ACK feedback of a CBG granularity;

eighth indication information indicating whether to report NDI information in the one-shot HARQ-ACK codebook;

ninth indication information indicating whether to enable spatial bundling when the HARQ-ACK codebook is carried on the PUCCH; or tenth indication information indicating whether to enable spatial bundling when the HARQ-ACK codebook is carried on the PUSCH.

In some implementations, in a case that the DCI further includes overriding parameter(s), each of which will overrid the corresponding configuration parameter, the codebook generation module includes:

a codebook generation submodule, configured to generate the one-shot HARQ-ACK codebook according to the overriding parameter(s);

or generate the one-shot HARQ-ACK codebook according to the overriding parameter(s) in a case of determining that the overriding parameter(s) are valid according to the priority index indicated by the priority indicator field of the DCI.

In the embodiments of this application, the one-shot HARQ-ACK codebook is generated and transmitted according to the configuration parameter of the priority indicated by the priority indicator field, so that the efficiency and reliability of codebook generation and reporting can be improved.

It should be noted that, the apparatus for determining a HARQ-ACK codebook according to the embodiments of this application is an apparatus that can perform the foregoing method for determining a HARQ-ACK codebook, all embodiments of the method for determining a HARQ-ACK codebook are applicable to the apparatus, and same or similar beneficial effects can all be achieved.

Figure 8:
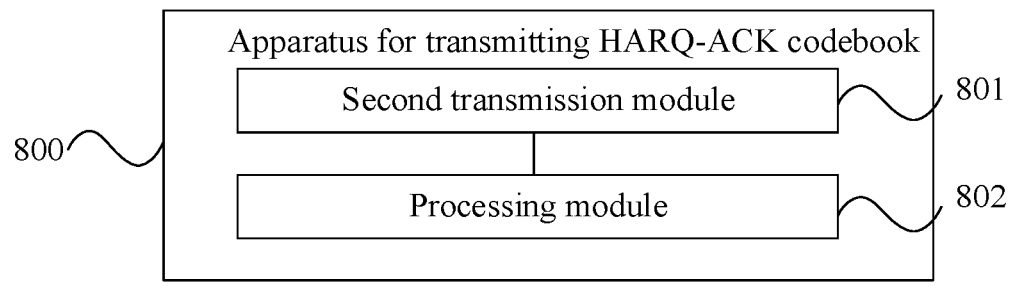
FIG. 8 is a schematic structural diagram of an apparatus for transmitting a HARQ-ACK codebook according to an embodiment of this application.

As shown in FIG. 8, an embodiment of this application further provides an apparatus 800 for transmitting a HARQ-ACK codebook, applied to a network-side device and including:

a second transmission module 801, configured to transmit DCI used for triggering a one-shot HARQ-ACK codebook to report, where the DCI includes a priority indicator field; and a processing module 802, configured to receive and parse the one-shot HARQ-ACK codebook according to a configuration parameter of a priority indicated by the priority indicator field.

In some implementations, the processing module includes:

a processing submodule, configured to receive, according to the configuration parameter of the priority indicated by the priority indicator field, a PUCCH or a PUSCH carrying the one-shot HARQ-ACK codebook.

In some implementations, in some implementations, the configuration parameter includes at least one of the following:

seventh indication information indicating whether to enable HARQ-ACK feedback of a CBG granularity;

eighth indication information indicating whether to report NDI information in the one-shot HARQ-ACK codebook;

ninth indication information indicating whether to enable spatial bundling when the HARQ-ACK codebook is carried on the PUCCH; or tenth indication information indicating whether to enable spatial bundling when the HARQ-ACK codebook is carried on the PUSCH.

In some implementations, in some implementations, the DCI further includes overriding parameter(s), each of which will overrid the corresponding configuration parameter.

In the embodiments of this application, the one-shot HARQ-ACK codebook is received and parsed according to the configuration parameter of the priority indicated by the priority indicator field, so that the efficiency and reliability of codebook transmission can be improved.

It should be noted that, the apparatus for transmitting a HARQ-ACK codebook according to the embodiments of this application is an apparatus that can perform the foregoing method for transmitting a HARQ-ACK codebook, all embodiments of the method for transmitting a HARQ-ACK codebook are applicable to the apparatus, and same or similar beneficial effects can all be achieved.

The information transmission apparatus, the apparatus for determining a HARQ-ACK codebook, and the apparatus for transmitting a HARQ-ACK codebook in the embodiments of this application may be apparatuses, or may be components, integrated circuits, or chips in the terminal. The apparatus may be a mobile electronic device or may be a non-mobile electronic device. For example, the mobile electronic device may be a mobile phone, a tablet computer, a notebook computer, a palmtop computer, an in-vehicle electronic device, a wearable device, an Ultra-Mobile Personal Computer (UMPC), a netbook, or a Personal Digital Assistant (PDA); and the non-mobile electronic device may be a server, a Network Attached Storage (NAS), a personal computer, a television, a teller machine, or an automatic teller machine, which are not specifically limited in the embodiments of this application.

The information transmission apparatus, the apparatus for determining a HARQ-ACK codebook, and the apparatus for transmitting a HARQ-ACK codebook in the embodiments of this application may be apparatuses including an operating system. The operating system may be an Android operating system, an ios operating system, or another possible operating system, which is not specifically limited in the embodiments of this application.

In some implementations, an embodiment of this application further provides an electronic device, and the electronic device is a terminal or a network-side device and includes a processor, a memory, and a program or instruction stored in the memory and executable on the process. When the program or instruction is executed by the processor, the processes of embodiments of the foregoing information transmission method are implemented, and same technical effects can be achieved. To avoid repetition, details are not described herein again.

In some implementations, an embodiment of this application further provides an electronic device, and the electronic device is a terminal and includes a processor, a memory, and a program or instruction stored in the memory and executable on the processor. When the program or instruction is executed by the processor, the processes of the embodiments of the method for determining a HARQ-ACK codebook are implemented, and same technical effects can be achieved. To avoid repetition, details are not described herein again.

In some implementations, an embodiment of this application further provides an electronic device, and the electronic device is a network-side device and includes a processor, a memory, and a program or instruction stored in the memory and executable on the processor. When the program or instruction is executed by the processor, the processes of the embodiments of the method for transmitting a HARQ-ACK codebook are implemented, and same technical effects can be achieved. To avoid repetition, details are not described herein again.

It should be noted that, the electronic device in the embodiments of this application includes the foregoing mobile electronic device and the non-mobile electronic device.

Figure 9:
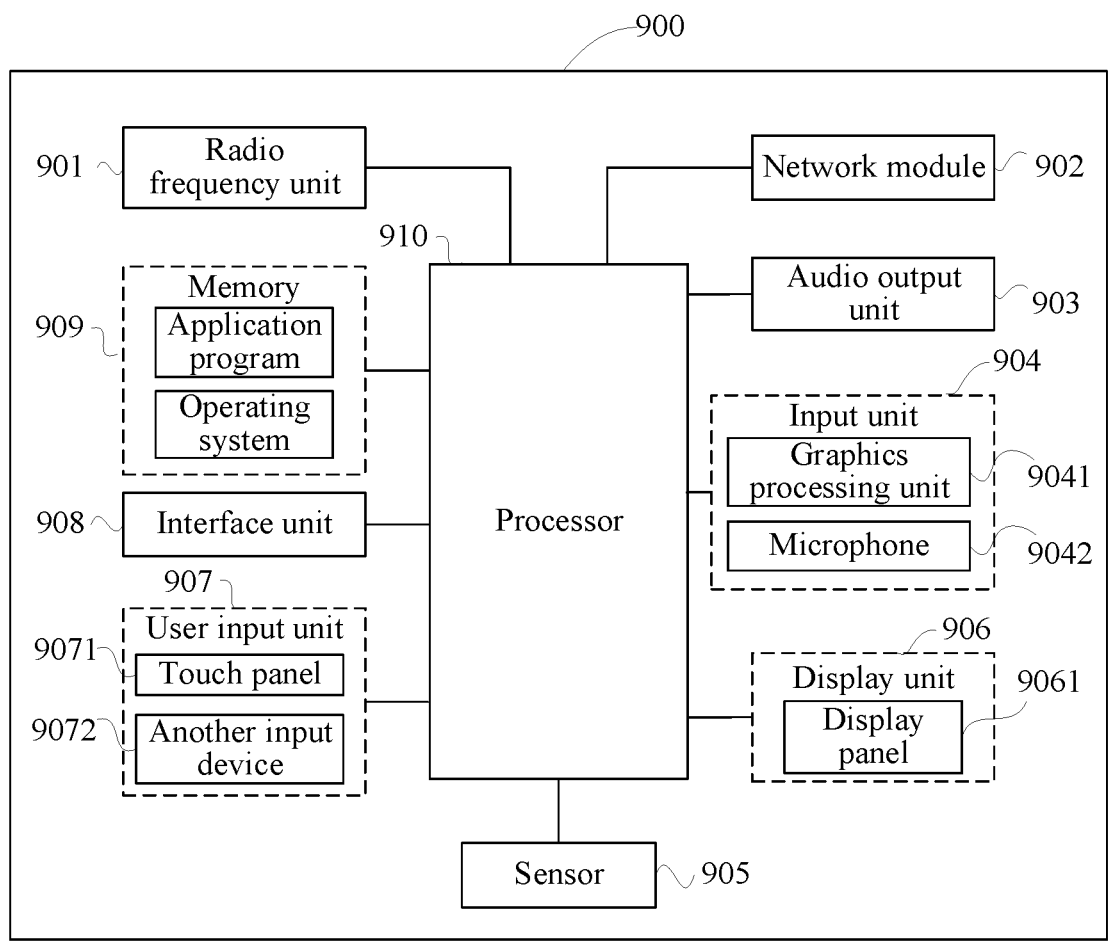
FIG. 9 is a first schematic structural diagram of an electronic device according to an embodiment of this application.

FIG. 9 is a schematic diagram of hardware structure of an electronic device (the electronic device is a terminal) implementing embodiments of this application.

The electronic device 900 includes, but not limited to: components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that, the electronic device 900 may further include a power supply (such as a battery) for supplying power to the components. Preferably, the power supply may be logically connected to the processor 910 by using a power supply management system, thereby implementing functions, such as charging, discharging, and power consumption management by using the power supply management system. The electronic device structure shown in FIG. 9 constitutes no limitation on the electronic device, and the electronic device may include more or fewer components than those shown in the figure, or some components may be combined, or a different component deployment may be used, which is not described herein again.

The radio frequency unit 901 is configured to receive DCI used for triggering a one-shot HARQ-ACK codebook to report, where the DCI carries assistance information instructing a terminal to perform one-shot HARQ-ACK codebook reporting.

In the embodiments of this application, by triggering assistance information carried in DCI of a one-shot HARQ-ACK codebook and instructing the terminal to perform one-shot HARQ-ACK codebook reporting, the efficiency and reliability of reporting are improved, and the flexibility of reporting triggering is improved.

The radio frequency unit 901 is also configured to receive DCI used for triggering a one-shot HARQ-ACK codebook to report, where the DCI includes a priority indicator field; and the processor 910 is configured to generate the one-shot HARQ-ACK codebook according to a configuration parameter of a priority indicated by the priority indicator field.

In the embodiments of this application, the one-shot HARQ-ACK codebook is generated and transmitted according to the configuration parameter of the priority indicated by the priority indicator field, so that the efficiency and reliability of codebook generation and reporting can be improved.

It should be understood that, in the embodiments of this application, the radio frequency unit 901 may be configured to receive and transmit signals during an information receiving and sending process or a call process. In some implementations, after downlink data from a base station is received, the radio frequency unit sends the downlink data to the processor 910 for processing. In addition, the radio frequency unit sends uplink data to the base station. The radio frequency unit 901 usually includes but is not limited to an antenna, at least one amplifier, a transceiver, a coupler, a low noise amplifier, or a duplexer. In addition, the radio frequency unit 901 may further communicate with a network device and another device through a wireless communication system.

The electronic device may help, by using the network module 902, a user to receive and send an email, browse a webpage, and access stream media, which provides wireless broadband Internet access for the user.

The audio output unit 903 may convert audio data received by the radio frequency unit 901 or the network module 902 or stored in the memory 909 into an audio signal and output the audio signal as sound. In addition, the audio output unit 903 may further provide an audio output that is related to a particular function executed by the electronic device 900 (for example, call signal receiving sound or message receiving sound). The audio output unit 903 includes a speaker, a buzzer, and a receiver.

The input unit 904 is configured to receive an audio signal or a video signal. The input unit 904 may include a Graphics Processing Unit (GPU) 9041 and a microphone 9042. The graphics processing unit 9041 processes image data of a static picture or a video that is obtained by an image acquisition apparatus (for example, a camera) in a video acquisition mode or an image acquisition mode. An image frame that has been processed may be displayed on the display unit 906. An image frame that has been processed by the graphics processing unit 9041 may be stored in the memory 909 (or another storage medium) or transmitted through the radio frequency unit 901 or the network module 902. The microphone 9042 may receive sound and can process the sound into audio data. The processed audio data may be converted, in a phone talk mode, to a format that may be sent to a mobile communication base station through the radio frequency unit 901 to output.

The electronic device 900 may further include at least one sensor 905, such as an optical sensor, a motion sensor, and other sensors. In some implementations, the optical sensor includes an ambient light sensor and a proximity sensor. The ambient light sensor may adjust luminance of a display panel 9061 according to brightness of the ambient light. The proximity sensor may switch off the display panel 9061 and/or backlight when the electronic device 900 is moved to the ear. As one type of the motion sensor, an acceleration sensor may detect a magnitude of acceleration in various directions (generally three axes), and may detect a magnitude and a direction of gravity when static, which may be configured to recognize electronic device gestures (such as switching between landscape orientation and portrait orientation, a related game, and magnetometer posture calibration), vibration recognition related functions (such as a pedometer and a knock), and the like. The sensor 905 may further include a fingerprint sensor, a pressure sensor, an iris sensor, a molecular sensor, a gyroscope, a barometer, a hygrometer, a thermometer, or an infrared sensor, which is not described herein again.

The display unit 906 is configured to display information input by the user or information provided for the user. The display unit 906 may include a display panel 9061. In some implementations, the display panel 9061 may be configured in a form such as a Liquid Crystal Display (LCD) or an Organic Light-Emitting Diode (OLED).

The user input unit 907 may be configured to receive input numeral or character information, and generate a key signal input related to a user setting and function control of the electronic device. In some implementations, the user input unit 907 includes a touch panel 9071 and another input device 9072. The touch panel 9071, also referred to as a touchscreen, may collect a touch operation of a user on or near the touch panel (such as an operation of a user on or near the touch panel 9071 by using any suitable object or attachment, such as a finger or a stylus). The touch panel 9071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, then sends the contact coordinates to the processor 910, and receives and executes a command sent by the processor 910. In addition, the touch panel 9071 may be implemented by using various types, such as a resistive type, a capacitance type, an infrared type, and a surface acoustic wave type. In addition to the touch panel 9071, the user input unit 907 may further include the another input device 9072. In some implementations, the another input device 9072 may include, but is not limited to, a physical keyboard, a functional key (such as a volume control key or a switch key), a track ball, a mouse, and a joystick, which is not described herein again.

Further, the touch panel 9071 may cover on the display panel 9061. After detecting a touch operation on or near the touch panel 9071, the touch panel transmits the touch operation to the processor 910, to determine a type of a touch event. Then, the processor 910 provides a corresponding visual output on the display panel 9061 according to the type of the touch event. In FIG. 9, although the touch panel 9071 and the display panel 9061 implement, as two independent components, input and output functions of the electronic device. However, in some embodiments, the touch panel 9071 and the display panel 9061 may be integrated to implement the input and output functions of the electronic device, which is not specifically limited herein.

The interface unit 908 is an interface through which an external apparatus and the electronic device 900 are connected. For example, the external apparatus may include a wired or wireless headset port, an external power supply (or a battery charger) port, a wired or wireless data port, a storage card port, a port used to connect an apparatus having an identification module, an audio Input/Output (I/O) port, a video I/O port, or an earphone port. The interface unit 908 may be configured to receive an input (for example, data information or power) from the external apparatus, and transmit the received input to one or more elements in the electronic device 900, or may be configured to transmit data between the electronic device 900 and the external apparatus.

The memory 909 may be configured to store a software program and data. The memory 909 may mainly include a program storage area and a data storage area. The program storage area may store an operating system, an application program required by at least one function (for example, a sound playing function and an image playing function), or the like. The data storage area may store data (for example, audio data and a phone book) created according to use of the mobile phone. In addition, the memory 909 may include a high speed random access memory, and may further include a non-volatile memory, such as at least one magnetic disk storage device, a flash memory device, or other volatile solid state storage devices.

The processor 910 is a control center of the electronic device, and connects various parts of the entire electronic device by using various interfaces and lines. By miming or executing the software program and/or module stored in the memory 909, and invoking data stored in the memory 909, the processor performs various functions of the electronic device and processes data, thereby performing overall monitoring on the electronic device. The processor 910 may include one or more processing units. In some implementations, the processor 910 may integrate an application processor and a modem processor. The application processor mainly processes an operating system, a user interface, and an application program. The modem processor mainly processes wireless communication. It may be understood that the foregoing modem processor may not be integrated into the processor 910.

The electronic device 900 may further include the power supply (for example, a battery) for supplying power to the components. Preferably, the power supply may be logically connected to the processor 910 by using a power management system, thereby implementing functions such as charging management, discharging management, and power consumption management by using the power management system.

In addition, the electronic device 900 includes some functional modules that are not shown, and details are not described herein again.

Figure 10:
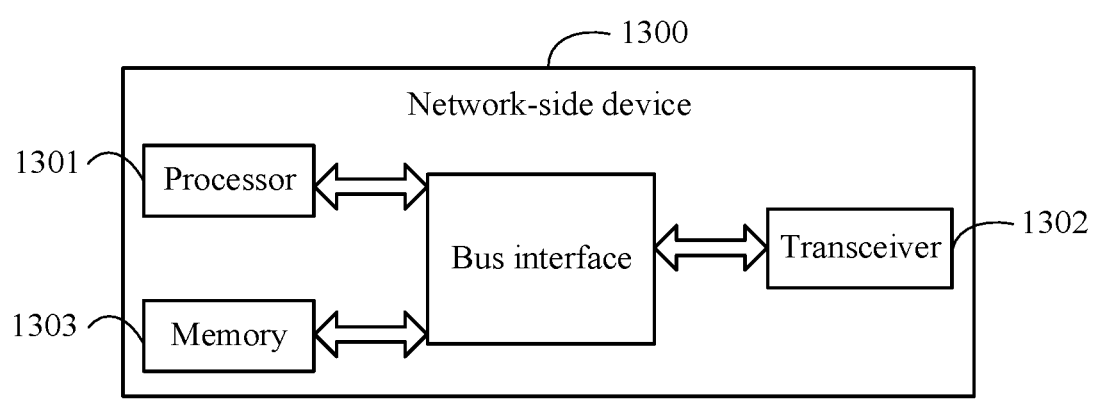
FIG. 10 is a second schematic structural diagram of an electronic device according to an embodiment of this application.

FIG. 10 is a structural diagram of an electronic device (the electronic device is a network-side device) according to an embodiment of this application, which can realize details of the foregoing information transmission method and achieve same effects. As shown in FIG. 10, the network-side device 1300 includes a processor 1301, a transceiver 1302, a memory 1303, and a bus system.

The processor 1301 is configured to read a program stored in the memory 1303, to perform the following procedure:

transmitting DCI used for triggering a one-shot HARQ-ACK codebook to report, where the DCI carries assistance information instructing a terminal to perform one-shot HARQ-ACK codebook reporting.

In the embodiments of this application, by triggering assistance information carried in DCI of a one-shot HARQ-ACK codebook and instructing the terminal to perform one-shot HARQ-ACK codebook reporting, the efficiency and reliability of reporting are improved, and the flexibility of reporting triggering is improved.

In some implementations, the processor 1301 is configured to read a program stored in the memory 1303, to perform the following procedure:

transmitting downlink control information DCI used for triggering a one-shot hybrid automatic repeat request acknowledgement HARQ-ACK codebook to report, where the DCI includes a priority indicator field; and receiving and parsing the one-shot HARQ-ACK codebook according to a configuration parameter of a priority indicated by the priority indicator field.

In the embodiments of this application, the one-shot HARQ-ACK codebook is received and parsed according to the configuration parameter of the priority indicated by the priority indicator field, so that the efficiency and reliability of codebook transmission can be improved.

In FIG. 10, a bus architecture may include any quantity of interconnected buses and bridges, and connects together circuits that are of one or more processors represented by the processor 1301 and of a memory represented by the memory 1303. The bus architecture may further connect various other circuits of a peripheral device, a voltage regulator, or a power management circuit. This is well known in the art, and therefore, no further description is provided in this specification. The bus interface provides an interface. The transceiver 1302 may be a plurality of components, including a transmitter and a transceiver, and providing units for communicating with various other apparatuses on a transmission medium.

An embodiment of this application further provides a readable storage medium, and the readable storage medium stores a program or instruction. When the program or instruction is executed by a processor, the processes of embodiments of the foregoing information transmission method are implemented, and same technical effects can be achieved. To avoid repetition, details are not described herein again.

An embodiment of this application further provides a readable storage medium, and the readable storage medium stores a program or instruction. When the program or instruction is executed by a processor, the processes of the embodiments of the method for determining a HARQ-ACK codebook are implemented, and same technical effects can be achieved. To avoid repetition, details are not described herein again.

An embodiment of this application further provides a readable storage medium, and the readable storage medium stores a program or instruction. When the program or instruction is executed by a processor, the processes of the embodiments of the method for transmitting a HARQ-ACK codebook are implemented, and same technical effects can be achieved. To avoid repetition, details are not described herein again.

The processor is the processor in the electronic device described in the foregoing embodiments. The readable storage medium may include a computer-readable storage medium such as a computer Read-Only Memory (ROM), a Random Access Memory (RAM), a magnetic disk, and an optical disc.

An embodiment of this application further provides a chip, including a processor and a communication interface, the communication interface being coupled to the processor, the processor being configured to execute a program or instruction, to implement the processes of the embodiments of the foregoing information transmission method and achieve same technical effects. To avoid repetition, details are not described herein again.

An embodiment of this application further provides a chip, including a processor and a communication interface, the communication interface being coupled to the processor, the processor being configured to execute a program or instruction, to implement the processes of the embodiments of the method for determining a HARQ-ACK codebook and achieve same technical effects. To avoid repetition, details are not described herein again.

An embodiment of this application further provides a chip, including a processor and a communication interface, the communication interface being coupled to the processor, the processor being configured to execute a program or instruction, to implement the processes of the embodiments of the method for transmitting a HARQ-ACK codebook and achieve same technical effects. To avoid repetition, details are not described herein again.

It should be understood that, the chip mentioned in this embodiment of this application may also be referred to as a system-level chip, a system chip, a chip system, or a system on chip.

It should be noted that, terms "include," "comprise," and any variants thereof are intended to cover a non-exclusive inclusion. Therefore, in the context of a process, method, object, or device that includes a series of elements, the process, method, object, or device not only includes such elements, but also includes other elements not clearly listed, or may include inherent elements of the process, method, object, or device. Without more limitations, elements defined by the sentence "including one" does not exclude other same elements existing in the process, method, object, or apparatus that includes the element. In addition, it should be noted that, the method and apparatus range in the implementations of this application do not execute functions according to a sequence that is shown or discussed, and may further execute functions simultaneously or in a reverse sequence according to involved functions. For example, the described method may be performed according to a sequence different from that described herein, and various steps may be further added, omitted, or combined. In addition, features described with reference to some examples may also be combined in other examples.

Through the foregoing description of the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions in this application essentially or the part contributing to the related art may be implemented in the form of a software product. The computer software product is stored in a storage medium (for example, a ROM/RAM, a magnetic disk, or an optical disc), and includes several instructions for instructing a terminal (which may be a mobile phone, a computer, a server, an air conditioner, or a network device) to perform the method described in the embodiments of this application.

The embodiments of this application are described above with reference to the accompanying drawings, but this application is not limited to the foregoing specific implementations. The foregoing specific implementations are merely exemplary rather than limitative, a person of ordinary skill in the art may still make various forms when inspired by this application without departing from the purpose of this application and the protection scope of the claims, and the forms shall fall within the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, performed by a network-side device and comprising:
    transmitting Downlink Control Information (DCI) used for triggering a one-shot Hybrid Automatic Repeat reQuest ACKnowledgement (HARQ-ACK) codebook to report,
    wherein the DCI carries assistance information instructing a terminal to perform one-shot HARQ-ACK codebook reporting, wherein the assistance information comprises:
        information about serving cell(s) corresponding to the one-shot HARQ-ACK codebook to be reported;
        information about HARQ process(es) corresponding to the one-shot HARQ-ACK codebook to be reported;
        information indicating whether to enable HARQ-ACK feedback of a Code Block Group (CBG(s)) granularity; and
        information indicating whether to report New Data Indicator (NDI) information in the one-shot HARQ-ACK codebook,
    wherein the assistance information is carried in the DCI through at least one second indicator field; and the second indicator field is an information indicator field obtained by dividing a bit sequence corresponding to a third indicator field in the DCI according to the assistance information.

2. The method according to claim 1, wherein the assistance information comprises at least one of the following:
information about Transport Block (TB(s)) corresponding to the one-shot HARQ-ACK codebook to be reported;
information about CBG(s) corresponding to the one-shot HARQ-ACK codebook to be reported; or
high-level configuration parameter(s) for the one-shot HARQ-ACK codebook to be reported.

3. The method according to claim 2, wherein the information about serving cell(s) corresponding to the one-shot HARQ-ACK codebook to be reported comprises at least one of the following:
an index of a first serving cell for which the corresponding HARQ-ACK is configured to be included in the one-shot HARQ-ACK codebook to be reported;
an index of a last serving cell for which the corresponding HARQ-ACK is configured to be included in the one-shot HARQ-ACK codebook to be reported;
an index of a first serving cell for which the corresponding HARQ-ACK is configured to be included in the one-shot HARQ-ACK codebook to be reported and an index of a last serving cell for which the corresponding HARQ-ACK is configured to be included in the one-shot HARQ-ACK codebook to be reported;
an index of a first serving cell for which the corresponding HARQ-ACK is configured to be included in the one-shot HARQ-ACK codebook to be reported and a number of continuous indexes of a serving cell for which the corresponding HARQ-ACK is configured to be included in the one-shot HARQ-ACK codebook to be reported;
first indication information indicating whether each serving cell needs to report HARQ-ACK; or
an index of at least one serving cell set for which the corresponding HARQ-ACK is configured to be included in the one-shot HARQ-ACK codebook to be reported.

4. The method according to claim 2, wherein the information about HARQ process(es) corresponding to the one-shot HARQ-ACK codebook to be reported comprises at least one of the following:
an identifier of a first HARQ process for which the corresponding HARQ-ACK is configured to be included in the one-shot HARQ-ACK codebook to be reported;
an identifier of a last HARQ process for which the corresponding HARQ-ACK is configured to be included in the one-shot HARQ-ACK codebook to be reported;
an identifier of a first HARQ process for which the corresponding HARQ-ACK is configured to be included in the one-shot HARQ-ACK codebook to be reported and an identifier of a last HARQ process for which the corresponding HARQ-ACK is configured to be included in the one-shot HARQ-ACK codebook to be reported;
an identifier of a first HARQ process for which the corresponding HARQ-ACK is configured to be included in the one-shot HARQ-ACK codebook to be reported and a number of continuous identifiers of a HARQ process for which the corresponding HARQ-ACK is configured to be included in the one-shot HARQ-ACK codebook to be reported; or
second indication information indicating whether each HARQ process needs to report HARQ-ACK.

5. The method according to claim 2, wherein the information about TB(s) corresponding to the one-shot HARQ-ACK codebook to be reported comprises at least one of the following:
indicating HARQ-ACK for TB index 0 is configured to be included in the one-shot HARQ-ACK codebook to be reported; or
indicating HARQ-ACK for TB index 0 and 1 is configured to be included in the one-shot HARQ-ACK codebook to be reported.

6. The method according to claim 2, wherein the information about CBG(s) corresponding to the one-shot HARQ-ACK codebook to be reported comprises:
a maximum index of the CBG(s) corresponding to the one-shot HARQ-ACK codebook to be reported.

7. The method according to claim 2, wherein the high-level configuration parameter(s) for the one-shot HARQ-ACK codebook to be reported comprises at least one of the following:
third indication information indicating whether to enable spatial bundling when the HARQ-ACK codebook is carried on a Physical Uplink Control CHannel (PUCCH); or
fourth indication information indicating whether to enable spatial bundling when the HARQ-ACK codebook is carried on a Physical Uplink Shared CHannel (PUSCH).

8. The method according to claim 1, wherein the assistance information is carried in the DCI through a first indicator field; and the first indicator field satisfies at least one of the following conditions:
an indicator field that is not used and exists in the DCI;
an indicator field with a fixed number of bits; or
an indicator field both existing in a first DCI format and existing in a second DCI format.

9. The method according to claim 8, wherein the first indicator field comprises at least one of the following:
a time domain resource assignment indicator field;
a Virtual Resource Block (VRB) to Physical Resource Block (PRB) mapping indicator field;
a modulation and coding scheme indicator field;
a new data indicator field;
a redundancy version indicator field;
a HARQ process identifier indicator field; or
a downlink assignment index indicator field.

10. An information transmission method, performed by a terminal and comprising:
receiving Downlink Control Information (DCI) used for triggering a one-shot Hybrid Automatic Repeat reQuest ACKnowledgement (HARQ-ACK) codebook to report, wherein the DCI carries assistance information instructing a terminal to perform one-shot HARQ-ACK codebook reporting,
wherein the assistance information comprises:
information about serving cell(s) corresponding to the one-shot HARQ-ACK codebook to be reported;
information about HARQ process(es) corresponding to the one-shot HARQ-ACK codebook to be reported;
information indicating whether to enable HARQ-ACK feedback of a Code Block Group (CBG(s)) granularity; and
information indicating whether to report New Data Indicator (NDI) information in the one-shot HARQ-ACK codebook, wherein the assistance information is carried in the DCI through at least one second indicator field; and the second indicator field is an information indicator field obtained by dividing a bit sequence corresponding to a third indicator field in the DCI according to the assistance information.

11. The method according to claim 10, wherein the assistance information comprises at least one of the following:

information about Transport Block (TB(s)) corresponding to the one-shot HARQ-ACK codebook to be reported;

information about CBG(s) corresponding to the one-shot HARQ-ACK codebook to be reported; or high-level configuration parameter(s) for the one-shot HARQ-ACK codebook to be reported.

12. The method according to claim 11, wherein the information about serving cell(s) corresponding to the one-shot HARQ-ACK codebook to be reported comprises at least one of the following:

an index of a first serving cell for which the corresponding HARQ-ACK is configured to be included in the one-shot HARQ-ACK codebook to be reported;

an index of a last serving cell for which the corresponding HARQ-ACK is configured to be included in the one-shot HARQ-ACK codebook to be reported;

an index of a first serving cell for which the corresponding HARQ-ACK is configured to be included in the one-shot HARQ-ACK codebook to be reported and an index of a last serving cell for which the corresponding HARQ-ACK is configured to be included in the one-shot HARQ-ACK codebook to be reported;

an index of a first serving cell for which the corresponding HARQ-ACK is configured to be included in the one-shot HARQ-ACK codebook to be reported and a number of continuous indexes of a serving cell for which the corresponding HARQ-ACK is configured to be included in the one-shot HARQ-ACK codebook to be reported;

first indication information indicating whether each serving cell needs to report HARQ-ACK; or an index of at least one serving cell set for which the corresponding HARQ-ACK is configured to be included in the one-shot HARQ-ACK codebook to be reported.

13. The method according to claim 11, wherein the information about HARQ process(s) corresponding to the one-shot HARQ-ACK codebook to be reported comprises at least one of the following:

an identifier of a first HARQ process for which the corresponding HARQ-ACK is configured to be included in the one-shot HARQ-ACK codebook to be reported;

an identifier of a last HARQ process for which the corresponding HARQ-ACK is configured to be included in the one-shot HARQ-ACK codebook to be reported;

an identifier of a first HARQ process for which the corresponding HARQ-ACK is configured to be included in the one-shot HARQ-ACK codebook to be reported and an identifier of a last HARQ process for which the corresponding HARQ-ACK is configured to be included in the one-shot HARQ-ACK codebook to be reported;

an identifier of a first HARQ process for which the corresponding HARQ-ACK is configured to be included in the one-shot HARQ-ACK codebook to be reported and a number of continuous identifiers of a HARQ process for which the corresponding HARQ-ACK is configured to be included in the one-shot HARQ-ACK codebook to be reported; or second indication information indicating whether each HARQ process needs to report HARQ-ACK.

14. The method according to claim 11, wherein the information about TB(s) corresponding to the one-shot HARQ-ACK codebook to be reported comprises at least one of the following:

indicating HARQ-ACK for TB index 0 is configured to be included in the one-shot HARQ-ACK to be reported; or indicating HARQ-ACK for TB index 0 and 1 is configured to be included in the one-shot HARQ-ACK to be reported.

15. The method according to claim 11, wherein the information about CBG(s) corresponding to the one-shot HARQ-ACK codebook to be reported comprises:

a maximum index of the CBG(s) corresponding to the one-shot HARQ-ACK codebook to be reported.

16. The method according to claim 11, wherein the high-level configuration parameter(s) for the one-shot HARQ-ACK codebook to be reported comprises at least one of the following:

third indication information indicating whether to enable spatial bundling when the HARQ-ACK codebook is carried on a Physical Uplink Control CHannel (PUCCH); or fourth indication information indicating whether to enable spatial bundling when the HARQ-ACK codebook is carried on a Physical Uplink Shared CHannel (PUSCH).

17. The method according to claim 10, wherein the assistance information is carried in the DCI through a first indicator field; and the first indicator field satisfies at least one of the following conditions:

an indicator field that is not used and exists in the DCI;

an indicator field with a fixed number of bits; or an indicator field both existing in a first DCI format and existing in a second DCI format.

18. A terminal, comprising:

a memory storing computer-readable instructions; and a processor coupled to the memory and configured to execute the computer-readable instructions, wherein the computer-readable instructions, when executed by the processor, cause the processor to perform operations comprising:

receiving Downlink Control Information (DCI) used for triggering a one-shot Hybrid Automatic Repeat reQuest ACKnowledgement (HARQ-ACK) codebook to report, wherein the DCI carries assistance information instructing a terminal to perform one-shot HARQ-ACK codebook reporting, wherein the assistance information comprises:

information about serving cell(s) corresponding to the one-shot HARQ-ACK codebook to be reported;

information about HARQ process(s) corresponding to the one-shot HARQ-ACK codebook to be reported;

information indicating whether to enable HARQ-ACK feedback of a Code Block Group (CBG(s)) granularity; and information indicating whether to report New Data Indicator (NDI) information in the one-shot HARQ-ACK codebook, wherein the assistance information is carried in the DCI through at least one second indicator field; and the second indicator field is an information indicator field obtained by dividing a bit sequence corresponding to a third indicator field in the DCI according to the assistance information.

19. A network-device, comprising a processor, a memory, and a program or instruction stored in the memory and executable on the processor, wherein when the program or instruction is executed by the processor, causes the processor to perform—the information transmission method according to the claim 1.

* * * * *